United States Patent
Vajravel et al.

(10) Patent No.: US 11,356,489 B2
(45) Date of Patent: Jun. 7, 2022

(54) ADAPTIVE STATE DETECTION FOR CONFERENCING SOLUTIONS

(71) Applicant: Dell Products L.P., Round Rock, TX (US)

(72) Inventors: Gokul Thiruchengode Vajravel, Bangalore (IN); Vivek Viswanathan Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 212 days.

(21) Appl. No.: 16/884,214

(22) Filed: May 27, 2020

(65) Prior Publication Data

US 2021/0377322 A1 Dec. 2, 2021

(51) Int. Cl.
| H04L 65/401 | (2022.01) |
| H04L 65/80 | (2022.01) |
| H04L 43/106 | (2022.01) |
| H04N 7/15 | (2006.01) |

(52) U.S. Cl.
CPC ........ *H04L 65/4015* (2013.01); *H04L 43/106* (2013.01); *H04L 65/80* (2013.01); *H04N 7/15* (2013.01)

(58) Field of Classification Search
CPC ... H04L 65/4015; H04L 43/106; H04L 65/80; H04L 65/403; H04L 12/18; H04L 65/1066; H04L 12/1813; H04L 67/12; H04N 7/15

See application file for complete search history.

(56) References Cited

U.S. PATENT DOCUMENTS

| 2009/0067440 A1* | 3/2009 | Chadda | H04L 63/0227 370/401 |
| 2012/0254361 A1* | 10/2012 | Malkhasyan | G06F 21/57 709/218 |
| 2013/0148721 A1* | 6/2013 | Chen | G09G 5/001 375/E7.243 |
| 2014/0297817 A1* | 10/2014 | Thikkalveettil | H04L 67/306 709/220 |
| 2015/0145944 A1* | 5/2015 | Stonefield | H04N 7/15 348/14.02 |
| 2017/0070702 A1* | 3/2017 | Rosenberg | H04N 7/147 |
| 2017/0118258 A1* | 4/2017 | Lieb | G06F 9/452 |
| 2017/0373997 A1* | 12/2017 | Deng | G06Q 50/01 |
| 2018/0124159 A1* | 5/2018 | Sun | H04W 4/21 |
| 2018/0302417 A1* | 10/2018 | Wilson | G06F 16/152 |
| 2020/0304452 A1* | 9/2020 | Yasui | G06F 3/1207 |

* cited by examiner

*Primary Examiner* — Hitesh Patel
(74) *Attorney, Agent, or Firm* — Kirton McConkie; Brian Tucker

(57) ABSTRACT

Adaptive state detection can be provided for conferencing solutions. A monitoring service can be executed on the computing system employed by each participant to access a conference. The monitoring service on a presenter computing system can detect when the presenter has commenced sharing his/her screen or application and can identify a schema for performing state detection. The monitoring service shares the schema with the monitoring services on the listener computing systems. As the screen content is shared, the monitoring services can implement the schema to cause state notifications to be provided to the monitoring service on the presenter computing system. The state notifications can represent whether the listener computing systems are receiving the shared screen content and/or to what extent the shared screen content is delayed.

20 Claims, 17 Drawing Sheets

ADAPTIVE STATE DETECTION FOR CONFERENCING SOLUTIONS

CROSS-REFERENCE TO RELATED APPLICATIONS

N/A

BACKGROUND

Many different conferencing/collaboration solutions (hereinafter "conferencing solutions") exist such as Skype, Microsoft Teams, Zoom and WebEx. Typically, these conferencing solutions employ a central server and require a conferencing application on the computing system employed by each participant in a conference. These conferencing applications each connect to and communicate with the central server as opposed to using a peer-to-peer model. Accordingly, during a conference, the presenter's audio, video, screen, etc. is first transferred to the central server, and then the central server distributes such content to the other participants.

The architecture of current conferencing solutions creates various technical problems. For example, if the central server becomes overloaded, it may introduce delay into the content distributed to all participants. Also, because the participants may access the central server over a wide variety of network connections, the participants may experience unequal delays or loss of content due to network congestion, bandwidth limitations or any other network issues. Furthermore, the participants may employ computing systems with different capabilities or loads that may cause the content, even if received over the network with no undue delay, to be rendered and displayed with different delays. Simply put, it is likely that at least some participants will experience a delay or lost content during a conference.

The severity of such issues varies based on the type of content that is being presented. For example, a presenter may share his/her screen to display a slide presentation, a spreadsheet, a word processing document, etc. In such cases, as the presenter's screen is updated (e.g., in response to advancing to the next slide in the presentation), the conferencing application on the presenter's computing system would send network communications containing the presenter's current screen to the central server which would then relay corresponding network communications to all other participants. If any participant's computing system fails to receive such network communications, that participant will not see the presenter's current screen but will instead continue to see the previous state of the presenter's screen until the presenter's screen is again updated or until the conferencing solution sends a periodic refresh.

When the presenter shares audio/video content or his/her entire desktop, both of which require much more bandwidth, the central server and the conferencing application on the presenter's computing system will determine an appropriate bitrate based on the network connection between the central server and the presenter's computing system. If this network connection has a higher capacity than the network connection between the central server and a participant's computing system, the participant may likely see jittery or out-of-sync content.

Because of such issues, it is not uncommon for a presenter to spend time during a conference polling the participants to ensure that they can see and hear the presenter or shared content and to confirm that the presenter can hear the participants. It is also not uncommon for a participant that joins a conference that is already underway to interrupt the conference to confirm that he/she can be heard or to notify the presenter that he/she cannot see the shared content.

BRIEF SUMMARY

The present invention extends to methods, systems, and computer program products for performing adaptive state detection for conferencing solutions. A monitoring service can be executed on the computing system employed by each participant to access a conference. The monitoring service on a presenter computing system can detect when the presenter has commenced sharing his/her screen or application and can identify a schema for performing state detection. The monitoring service shares the schema with the monitoring services on the listener computing systems. As the screen content is shared, the monitoring services can implement the schema to cause state notifications to be provided to the monitoring service on the presenter computing system. The state notifications can represent whether the listener computing systems are receiving the shared screen content and/or to what extent the shared screen content is delayed.

In some embodiments, the present invention may be implemented as a method for performing adaptive state detection during a conference. A monitoring service executing on a presenter computing system can detect that a conferencing application executing on the presenter computing system is distributing shared screen content. The monitoring service executing on the presenter computing system can select a schema for performing state detection and share the schema with a monitoring service executing on one or more listener computing systems. The monitoring service executing on the presenter computing system can identify a packet sent by the conferencing application. This packet can include shared screen content. In response to identifying the packet, the monitoring service executing on the presenter computing system can apply the schema to produce a reliability packet and send the reliability packet to the monitoring service executing on the one or more listener computing systems. The monitoring service executing on the presenter computing system can then receive a state notification from the monitoring service executing on at least one of the one or more listener computing systems. Each state notification can represent receipt of the shared screen content at the respective listener computing system.

In some embodiments, the present invention may be implemented as computer storage media storing computer executable instruction which when executed implement a method for performing adaptive state detection during a conference. This method can include: detecting, by a monitoring service executing on a presenter computing system, that a conferencing application executing on the presenter computing system is distributing shared screen content; selecting, by the monitoring service executing on the presenter computing system, a schema for performing state detection, the schema being selected based on a type of the shared screen content; sharing, by the monitoring service executing on the presenter computing system, the schema with a monitoring service executing on one or more listener computing systems; while the conferencing application is distributing the shared screen content, employing, by the monitoring service executing on the presenter computing system, the schema to repeatedly create and send reliability packets to the monitoring service executing on the one or more listener computing systems; and in response to repeatedly sending the reliability packets, repeatedly receiving, by the monitoring service executing on the presenter computing system, a state notification from the monitoring service executing on at least one of the one or more listener computing systems, each state notification representing receipt of the shared screen content at the respective listener computing system.

In some embodiments, the present invention may be implemented as a method for performing adaptive state detection during a conference. A monitoring service executing on a presenter computing system can detect that a conferencing application executing on the presenter computing system is distributing shared screen content. The monitoring service executing on the presenter computing system can then determine whether the shared screen content is high frequency content or low frequency content and select a schema for performing state detection based on whether the shared screen content is high frequency content or low frequency content. The monitoring service executing on the presenter computing system can then share the schema with a monitoring service executing on one or more listener computing systems. As the conferencing application sends packets containing the shared screen content, the monitoring service executing on the presenter computing system can apply the schema to produce reliability packets and send the reliability packets to the monitoring service executing on the one or more listener computing systems. The monitoring service executing on the presenter computing system can also receive state notifications from the monitoring service executing on the one or more listener computing systems. Each state notification can represent whether the respective listener computing system received the shared screen content or a delay at which the respective listener computing system is receiving the shared screen content.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In the specification and the claims, the term "conferencing solution" should encompass any solution that allows users of multiple computing systems to participate in a conference. The term "conferencing application" should be construed as encompassing the portion of the conferencing solution that is executed on a computing system to allow the user of the computing system to access a conference hosted by the conferencing solution. The term "computing system" should be construed as encompassing desktops, laptops, mobile devices and any other device that is capable of executing a conferencing application. All users that participate in a conference will be referred to as "participants." A participant that is currently presenting will be referred to as the "presenter," while the other participants will be referred to as "listeners." The terms "presenter computing system" and "listener computing system" will refer to the computing systems that the current presenter and listeners are using respectively. During a conference, there may be multiple presenters, and a listener may become a presenter and vice versa.

The term "shared content" will be used generally to encompass any type of audio and/or visual content that is generated at the presenter computing system and that the conferencing solution causes to be displayed/output on the listener computing system(s). Shared content would therefore include audio of the presenter (which could be captured by the conferencing application using the presenter computing system's microphone), video of the presenter (which could be captured by the conferencing application using the presenter computing system's camera), a user interface of an application that is displayed on the presenter computing system, the desktop of the presenter computing system, etc. The term "shared screen content" is a subset of shared content and refers to the entire desktop of the presenter computing system or the user interface of a single application that is executing (or at least displayed) on the presenter computing system. Common examples of shared screen content include a PowerPoint presentation, an Excel spreadsheet, a Word document, a PDF and video displayed in a media player or browser, among many others.

Figure 1:
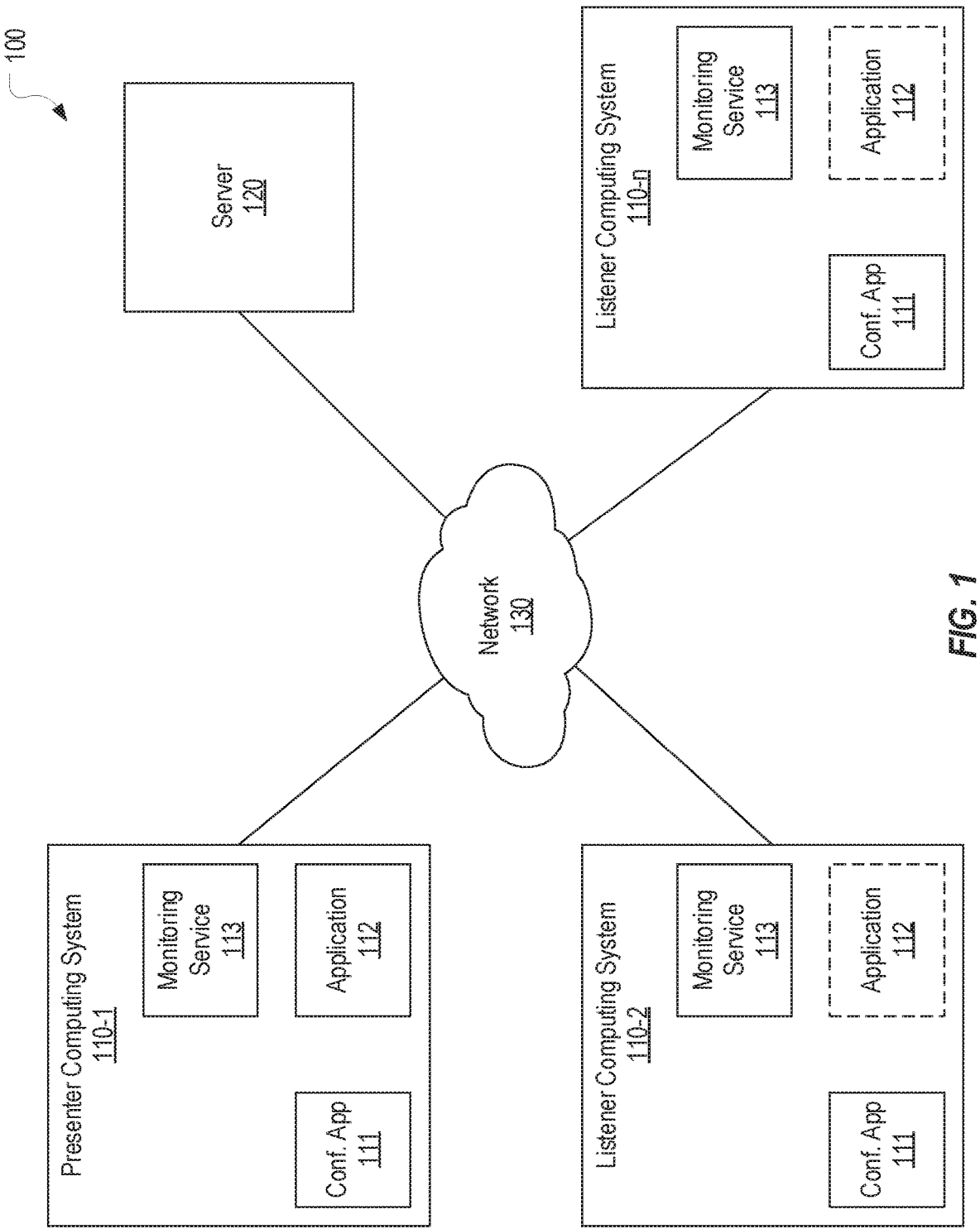
FIG. 1 illustrates an example computing environment in which embodiments of the present invention may be implemented.

FIG. 1 illustrates an example computing environment 100 in which embodiments of the present invention may be implemented. Computing environment 100 includes a number of computing systems 110-1 through 110-$n$ (where n represents any reasonable integer and which may be collectively referred to as "computing systems 110") and a server 120. Each of computing systems 110 includes a conferencing application 111. Conferencing application 111 may be a desktop application, a browser-based application, a mobile application or any other type of application capable of performing functionality described herein. Server 120 can represent any server-based architecture that a conferencing solution may employ including a single stand-alone server and a cloud. The combination of server 120 and conferencing applications 111 represent a conferencing solution.

In FIG. 1, it is assumed that the users of computing systems 110 are currently using conferencing application 111 to participate in a conference via server 120. It is also assumed that the user of computing system 110-1 is currently presenting, and therefore computing system 110-1 is labeled as presenter computing system 110-1 while the other computing systems are labeled as listener computing systems 110-2 through 110-*n*. It is further assumed that an application 112 is executing on presenter computing system 110-1 (as represented by solid lines) and the user interface of application 112 is being delivered as shared screen content through server 120 for display on each listener computing system 110-2 through 110-*n* (as represented by dashed lines). Although not shown, it can be assumed that audio and/or video of the presenter captured by conferencing application 111 on presenter computing system 110-1 may also be delivered to and output on each listener computing system 110-2 through 110-*n*. Accordingly, FIG. 1 represents a scenario where the presenter has selected to share a single application with the listeners as opposed to the entire screen.

In accordance with embodiments of the present invention, a monitoring service 113 can be employed on each computing system 110 to implement adaptive state detection during a conference, and particularly while presenter computing system 110-1 is delivering shared screen content to listener computing systems 110-2 through 110-*n*. As an overview, the instance of monitoring service 113 that is running on presenter computing system 110-1 can determine when the instance of conferencing application 111 running on presenter computing system 110-1 is delivering shared screen content to listener computing systems 110-2 through 110-*n*. When shared screen content is being delivered, monitoring service 113 can identify the type of the shared screen content. Based on the type of the shared screen content, monitoring service 113 can select a schema for implementing state detection and share the schema with the instances of monitoring service 113 running on listener computing systems 110-2 through 110-*n*. Then, monitoring service 113 on each computing system 110 can implement the schema to detect and report the state of each listener computing system 110-2 through 110-*n* to presenter computing system 110-1 during the conference. In this way, a presenter can reliably determine whether any listeners are failing to timely display the shared screen content.

Figure 2:
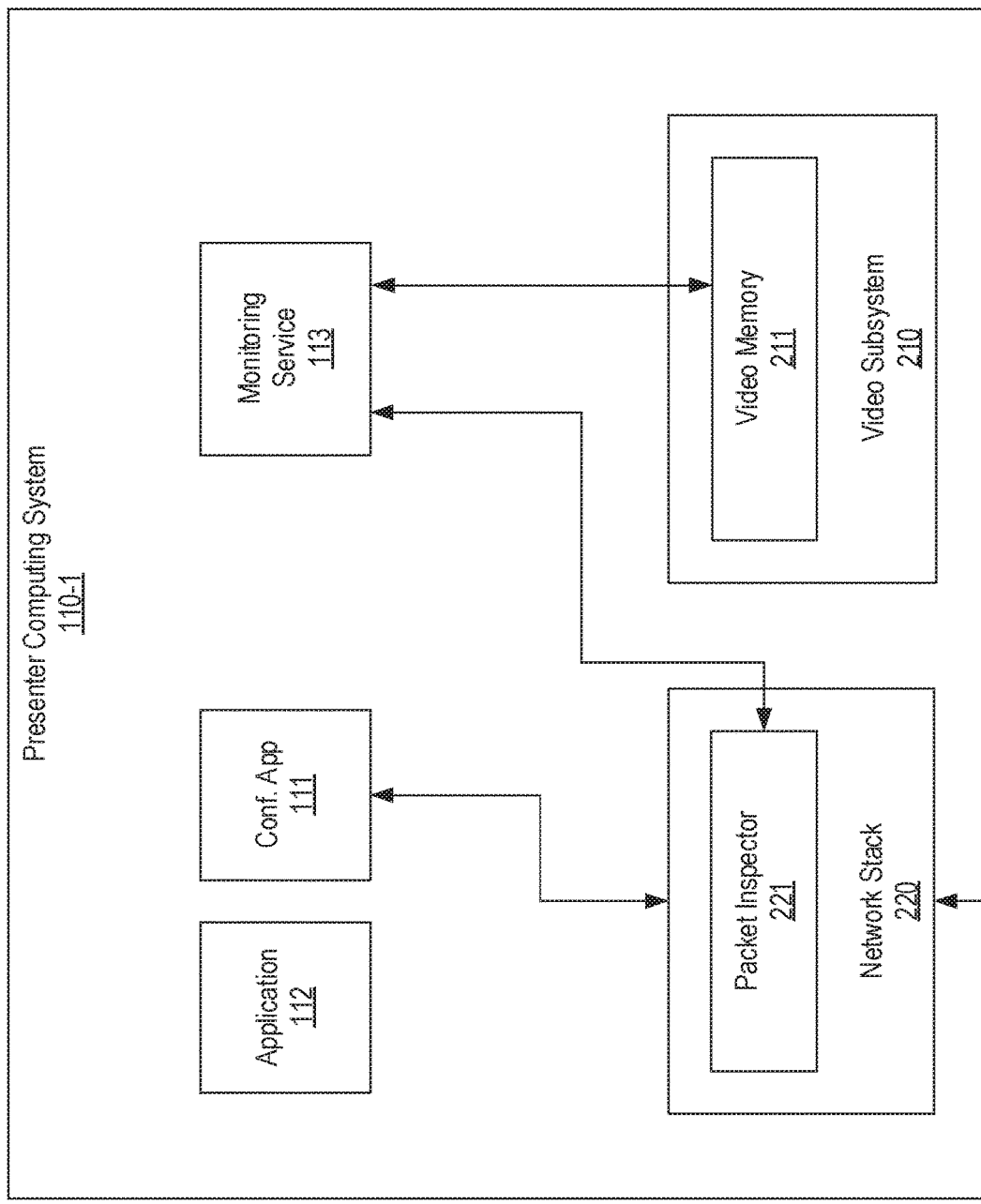
FIG. 2 illustrates an example of components that may be employed on a presenter computing system when some embodiments of the present invention are implemented.

FIG. 2 provides a more detailed example of components that may be employed on presenter computing system 110-1 in some embodiments of the present invention. In addition to running conferencing application 111, application 112 and monitoring service 113, which may be user mode components, presenter computing system 110-1 may also have a video subsystem 210 with video memory 211 and a network stack 220. Video subsystem 210 (which, as an example only, may include Intel Quick Sync) represents the components of presenter computing system 110-1 that may be employed to process and display visual content. Video subsystem 210 could be employed to display content locally as well as to encode content for delivery over a network. Of primary relevance to embodiments of the present invention, video memory 211 may store the user interface of application 112 (or another application that conferencing application 111 shares) or the entire screen prior to such content being shared to listener computing systems 110-2 through 110-*n*. Such content may typically be produced and stored in the form of frames or a sequence of frames (i.e., video). In some embodiments, conferencing application 111 may leverage video subsystem 210 to encode the frame(s) and may then send the encoded frame(s) to server 120. Accordingly, when presenter computing system 110-1 distributes shared screen content, it will typically be in the form of encoded frames that are stored in the payload of network packets.

Network stack 220 represents the components of presenter computing system 110-1 that manage the sending and receiving of network communications (or packets). For example, conferencing application 111 can employ network stack 220 to send network packets to and receive network packets from server 120. Depending on various factors, conferencing application 111 could employ an unreliable protocol (e.g., UDP) or a reliable protocol (e.g., TCP) to send shared content, including shared screen content, to server 120 for delivery to listener computing systems 110-2 through 110-*n*. Packet inspector 221 can represent any tool by which monitoring service 113 can intercept network packets sent by conferencing application 111 (e.g., Wireshark).

FIG. 2 represents that monitoring service 113 can be configured to access video memory 211 (e.g., via the Intel Media SDK when video subsystem is Intel Quick Sync) to retrieve shared screen content (e.g., in the form of decoded frames) and can also be configured to employ packet inspector 221 to intercept conferencing application 111's network packets containing encoded shared screen content. Although not shown, monitoring service 113 can also be configured to interface with conferencing application 111 and/or the operating system to make various determinations and/or to make various customizations as described below.

Figure 3:
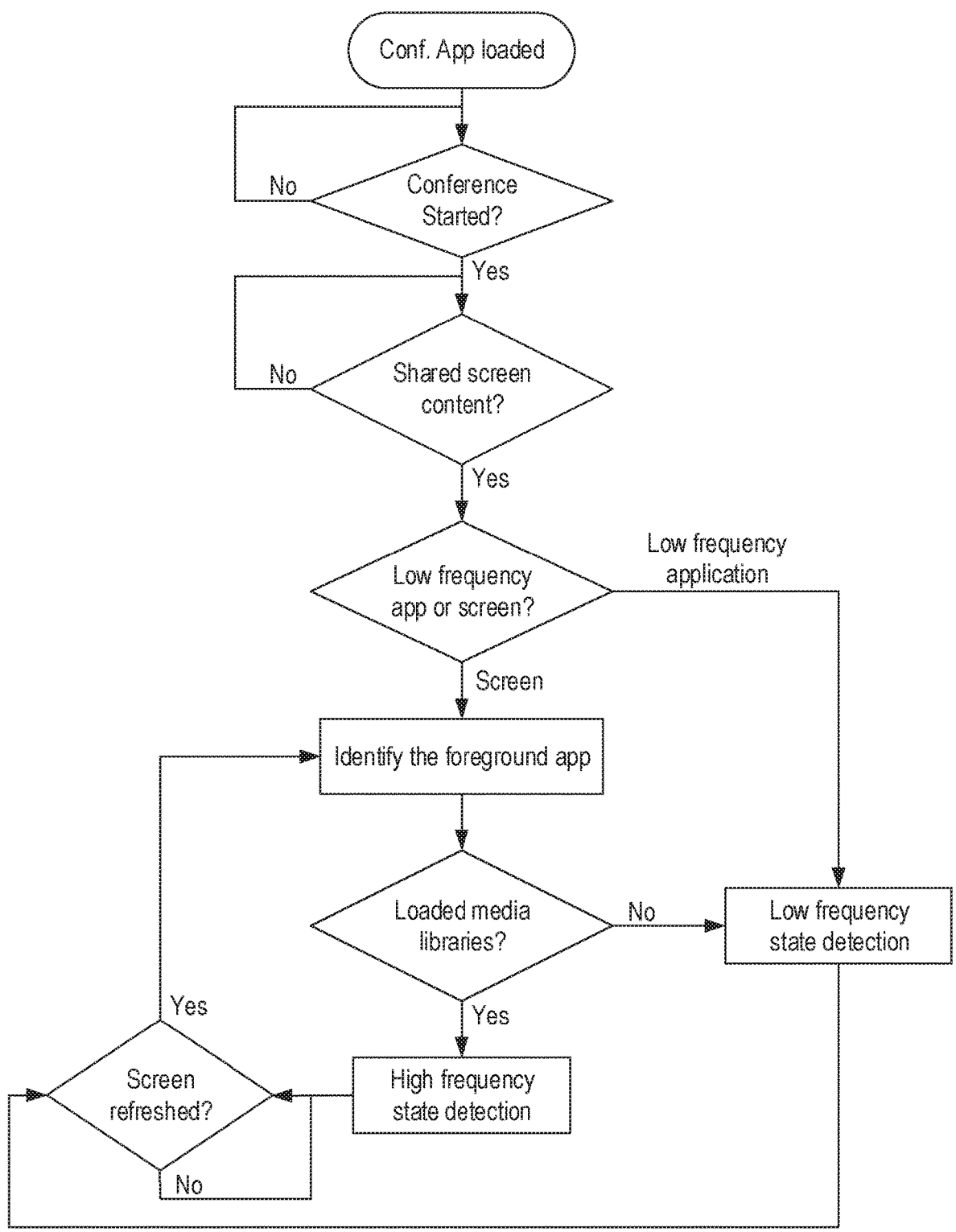
FIG. 3 illustrates an example flowchart of a process that a monitoring service can perform to identify which type of state detection to perform when shared screen content is distributed during a conference.

FIG. 3 provides a flow chart representing a process that monitoring service 113 can perform when conferencing application 111 executes to determine a type of shared screen content that conferencing application 111 is distributing during a conference. Typically, monitoring service 113 may run in the background and await the loading of conferencing application 111. Once conferencing application 111 is loaded and commences executing, monitoring service 113 can determine when conferencing application 111 has started a conference. Monitoring service 113 can make this determination using any available technique. For example, conferencing application 111 could provide APIs by which monitoring service 113 could register for such notifications (e.g., the webhooks API that Zoom provides). In use cases where conferencing application 111 may not provide a suitable API, monitoring service 113 could detect that a conference has commenced by monitoring running processes to determine when a camera is opened while conferencing application 111 is executing. In other words, monitoring service 113 could determine that a conference is commencing if conferencing application 111 is running when the camera is opened.

Regardless of how monitoring service 113 may determine when a conference has started, once a conference has started, monitoring service 113 can determine whether conferencing application 111 has commenced distributing shared screen content. Monitoring service 113 can also make this determination using any available technique. For example, conferencing application 111 could provide APIs by which monitoring service 113 could register for such notifications. In cases where conferencing application 111 may not provide suitable APIs, monitoring service 113 could detect when conferencing application 111 commences sending shared screen content by monitoring conferencing application 111 to determine when it calls the FindWindow( ) function and the GetDC( ) function (or other functions that perform similar functionality). The GetDC( ) function allows an application, which in this case would be conferencing application 111, to access the device context of a specified window or the entire screen/desktop. Therefore, monitoring service 113 can determine when conferencing application 111 is about to send shared screen content for a particular application by detecting that conferencing application 111 has called the FindWindow( ) function to obtain a handle to a window of the particular application (e.g., PowerPoint) and then has called the GetDC( ) function using the handle as input to obtain a handle to a device context for the client area of that window (e.g., to access the portion of the screen that contains PowerPoint's user interface). Monitoring service 113 could detect that conferencing application 113 is about to send shared screen content for the entire screen/desktop by determining when conferencing application 113 calls the GetDC( ) function without specifying a handle to the window of a particular application. Although not shown, monitoring service 113 could return to this step if conferencing application 111 switches to distributing different shared screen content (e.g., by detecting that conferencing application 111 has called FindWindow( ) and GetDC( ) to obtain a handle to the device context of a different window).

Regardless of how monitoring service 113 may determine when conferencing application 111 has commenced distributing shared screen content, monitoring service 113 can determine the type of the shared screen content. For example, monitoring service 113 could determine whether the shared screen content is "high frequency content" or "low frequency content." High frequency content can be viewed as visual content that changes frequently (e.g., when the shared screen content is video being played back in a media player or browser), whereas low frequency content can be viewed as visual content that changes infrequently or minimally (e.g., when the shared screen content is a PowerPoint presentation or a Word document).

Returning to the flow chart in FIG. 3, monitoring service 113 can initially determine whether the shared screen content is low frequency content based on the application whose user interface is being shared (or, in some cases, based on the fact that the user interface of a single application is shared as opposed to the entire screen). For example, if monitoring service 113 determines that conferencing application 111 has commenced sharing the user interface of PowerPoint, Word, Excel or some other application that has been categorized as producing low frequency content, monitoring service 113 could transition directly to low frequency state detection. In contrast, if conferencing application 111 has not commenced sharing the user interface of a "low frequency application," which may be the case when conferencing application 111 has commenced sharing the entire screen, a portion of the screen that appears on a single display or the user interface of an application that is not categorized as a low frequency application, monitoring service 113 can identify which application is in the foreground and then determine whether the foreground application has loaded media libraries. If not, which may be the case when PowerPoint, Word, Excel, etc. is the foreground application, monitoring service 113 can employ low frequency state detection. If so, which may be the case when a media player or browser is the foreground application, monitoring service 113 can employ high frequency state detection.

While conferencing application 111 is distributing shared screen content, monitoring service 113 can monitor to detect when the screen is refreshed. When it detects that the screen is refreshed, monitoring service 113 can again identify the foreground application, determine whether the foreground application has loaded media libraries and then select high or low frequency state detection accordingly to thereby ensure that it performs the appropriate type of state detection for the type of content being shared.

Although not shown, if conferencing application 111 stops distributing shared screen content during the conference, monitoring service 113 can return to the "shared screen content?" step. Notably, the instance of monitoring service 113 on all computing systems 110 that are connected to the conference can perform the process depicted in FIG. 3. In this way, regardless of who the current presenter may be, if the presenter commences distributing shared screen content, the instance of the monitoring service 113 executing on that presenter's computing system 110 can identify whether low or high frequency state detection should be performed while the shared screen content is being distributed.

Figure 4:
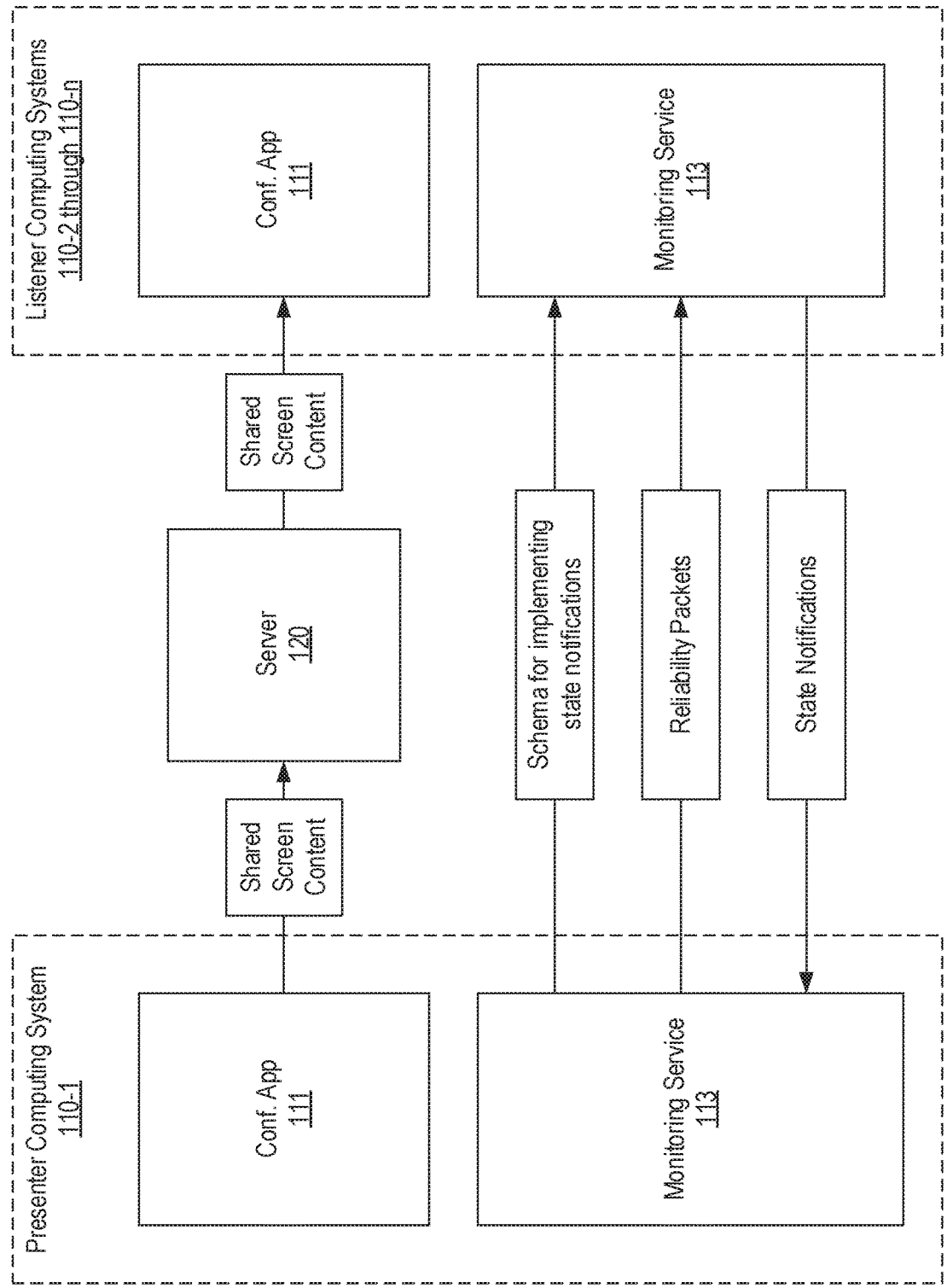
FIG. 4 represents how monitoring services on a presenter computing system and each listener computing system may communicate to implement adaptive state detection.

FIG. 4 represents how the instance of monitoring service 113 on presenter computing system 110-1 communicates with the instances of monitoring service 113 on listener computing systems 110-2 through 110-$n$ while performing either high or low frequency state detection. First, based on the type of shared screen content (i.e., whether it is high frequency or low frequency content), monitoring service 113 on presenter computing system 110-1 can select a schema for implementing state detection. This schema can include one or more of a hashing type, a hashing frequency and a region of interest (ROI) of a frame of the shared screen content. In some embodiments, monitoring service 113 may also employ a load on the CPU of presenter computing system 110-1 in selecting the schema.

The following table provides some examples of schemas and when monitoring service 113 may select them. Not all schemas need to include each of the elements listed in the table.

| Type of shared screen content | CPU Load | Hashing Type | Hashing Frequency | ROI of Frame |
|---|---|---|---|---|
| Low frequency | 30% | pHash | On UI change | 100% |
| High frequency | 50% | pHash | Every $5^{th}$ frame or 100 ms | 80% |
| High frequency | 70% | libPuzzle | Every $10^{th}$ frame or 250 ms | 70% |
| . | | | | |
| . | | | | |
| . | | | | |

In this table, there is one schema for low frequency content which defines the hashing type as pHash, the hashing frequency as "on UI change" and the ROI of the frame as 100% (i.e., the entire frame). As shown, there could be other schemas that may be selected for low frequency content and the selection could be based on the current CPU load (e.g., one schema selected for low frequency content when the CPU load is above 30% and another schema selected for low frequency content when the CPU load is above 50%). This table also shows two schemas for high frequency content. A first schema is employed for high frequency content when the CPU load is above 50% and defines a hashing type of pHash, a hashing frequency of "every $5^{th}$ frame of 100 ms" and a ROI of the frame as 80%. A second schema is employed for high frequency content when the CPU load is above 70% and defines a hashing type of libPuzzle, which is less accurate than pHash, a hashing frequency of "every $10^{th}$ frame or 250 ms" and a ROI of the frame as 70%.

Once monitoring service 113 has identified a schema for implementing reliability mechanisms, it can share the identified schema with monitoring service 113 on each listener computing system 110-2 through 110-$n$. For example, in general terms, if monitoring service 113 on presenter computing system 110-1 determines that conferencing application 111 has commenced sharing a PowerPoint presentation (low frequency content), it can notify monitoring service 113 on listener computing systems 110-2 through 110-$n$ that it will be employing pHash to hash the entire frame whenever the PowerPoint presentation advances to a new slide (or otherwise changes). Monitoring service 113 on each listener computing system 110-2 through 110-*n* can cache the schema it receives including any updates to the schema.

Once monitoring service 113 on presenter computing system 110-1 has identified the schema it will use and notified monitoring service 113 on listener computing systems 110-2 through 110-*n* of this schema, each monitoring service 113 can commence implementing the schema. This process will be described in greater detail below, but it entails sending reliability packets where the content of these reliability packets is generated using the identified schema. Notably, monitoring service 113 on presenter computing system 110-1 sends the reliability packets to monitoring service 113 on listener computing systems 110-2 through 110-*n* while conferencing application 111 on presenter computing system 110-1 sends the shared screen content via server 120 to the conferencing application 111 on listener computing systems 110-2 through 110-*n*. In some embodiments, monitoring services 113 can communicate via a reliable transport (e.g., TCP). In contrast, conferencing application 111 may oftentimes employ an unreliable transport (e.g., UDP) to communicate with server 120. As is also described in greater detail below, in response to receiving reliability packets, monitoring service 113 on listener computing systems 110-2 through 110-*n* can apply the identified schema to the content of the reliability packets and then send state notifications back to monitoring service 113 on presenter computing system 110-1 which can employ the state notifications to display a state of each listener computing systems 110-2 through 110-*n* on presenter computing system 110-1. For example, a green and red scheme or a green, yellow and red scheme could be employed to represent whether or to what extent a listener computing system is displaying the current shared screen content.

Figure 5A:
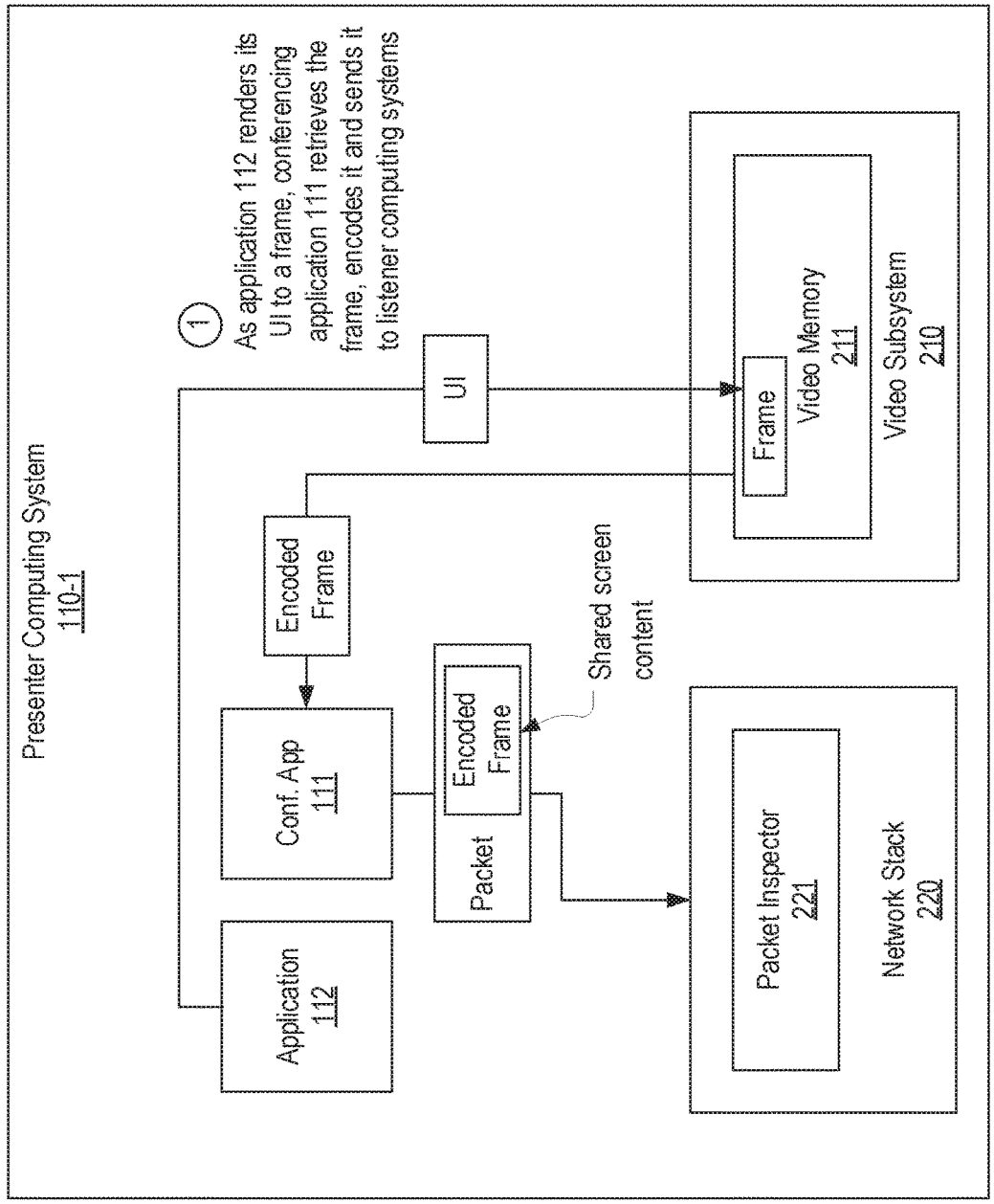
FIGS. 5A-5G represent an example of how low frequency state detection can be performed.

FIGS. 5A-5G illustrate an example of how monitoring services 113 can implement state detection when low frequency content is shared. FIG. 5A is intended to generally represent how conferencing application 111 distributes shared screen content when a single application's user interface is shared and provides context for the functionality that monitoring service 113 can perform. A similar process would be performed when the entire screen is shared and low frequency state detection is implemented. In FIG. 5A, it is assumed that conferencing application 111 has commenced a conference and has started sharing the user interface of application 112. It will be assumed that application 112 causes its user interface to be rendered in a frame maintained in video memory 211. Accordingly, in step 1, conferencing application 111 can retrieve the frame from video memory 211, encode it (e.g., using encoding functionality provided by video subsystem 210) and send the encoded frame (i.e., the shared screen content) in the payload of a network packet to server 120. Conferencing application 112 can repeatedly perform step 1 while the user interface of application 112 is being shared.

Figure 5B:
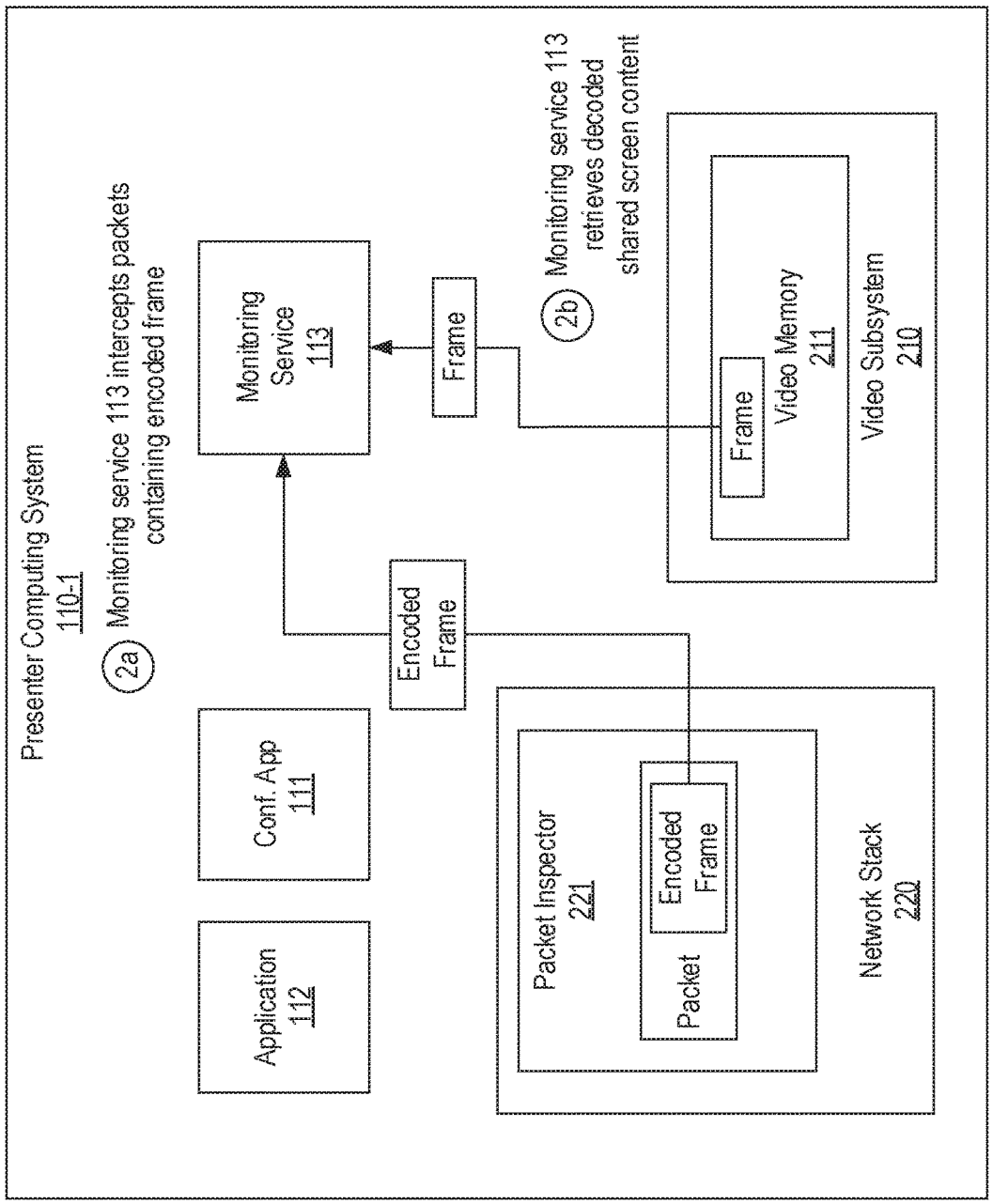

Turning to FIG. 5B, it is assumed that, based on the schema's hashing frequency being "on UI change," monitoring service 113 has registered to be notified whenever application 112 updates its user interface. Alternatively, if the entire screen is being shared, monitoring service 113 can register to be notified whenever any of the running applications update their user interface. In any case, when it receives such a notification, in step 2*a*, monitoring service 113 can employ packet inspector 221 to intercept the packet containing the encoded frame. This intercepting can be performed to confirm that conferencing application 111 is distributing shared screen content. In conjunction with intercepting a packet containing the encoded frame, in step 2*b*, monitoring service 113 can retrieve the corresponding decoded frame from video memory 211 (e.g., by employing a suitable SDK of video subsystem 210). Based on the ROI specified in the schema, monitoring service 113 can split the frame. For example, if the ROI is 70%, monitoring service 113 can extract 70% of the frame.

Figure 5C:
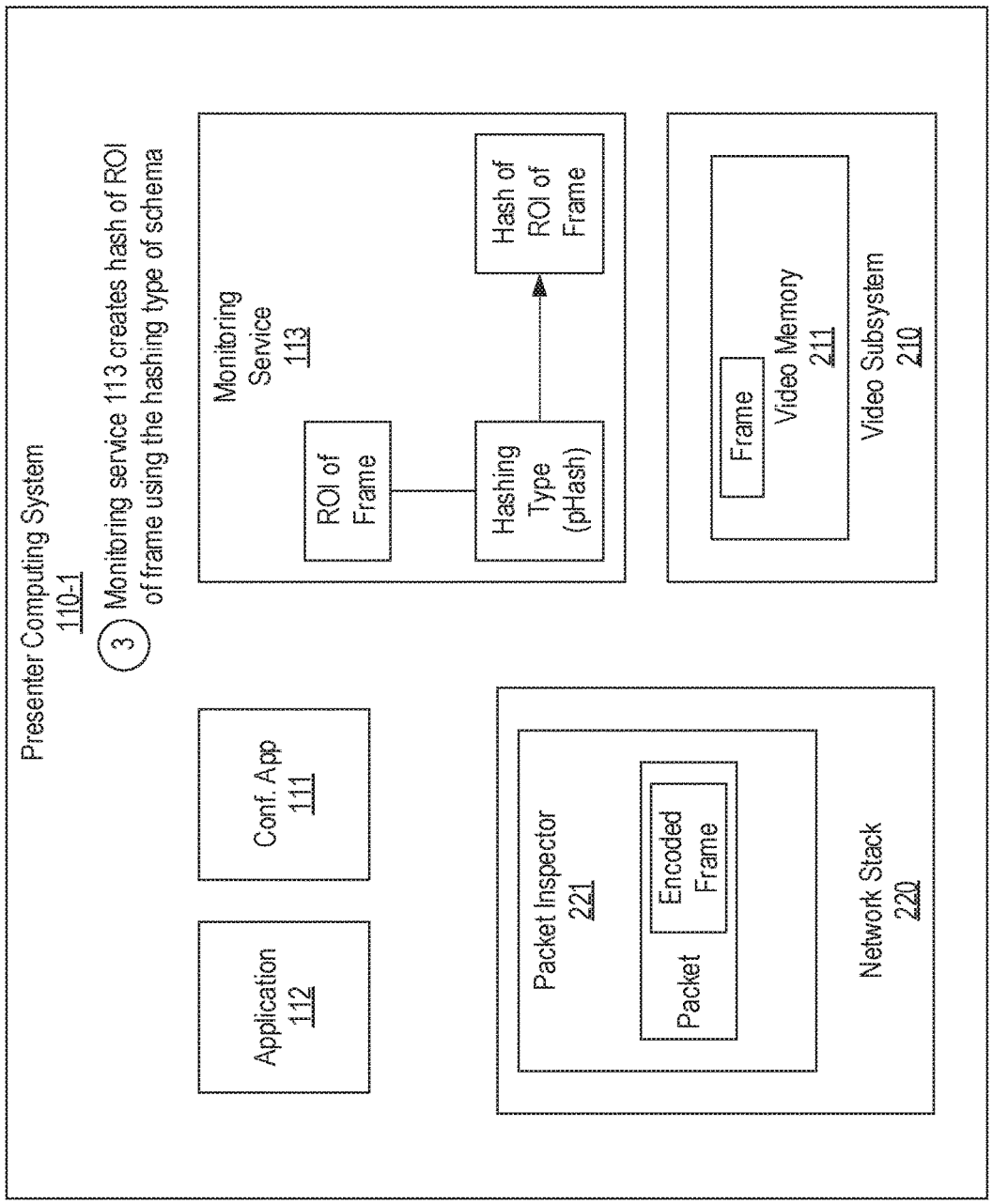
Figure 5D:
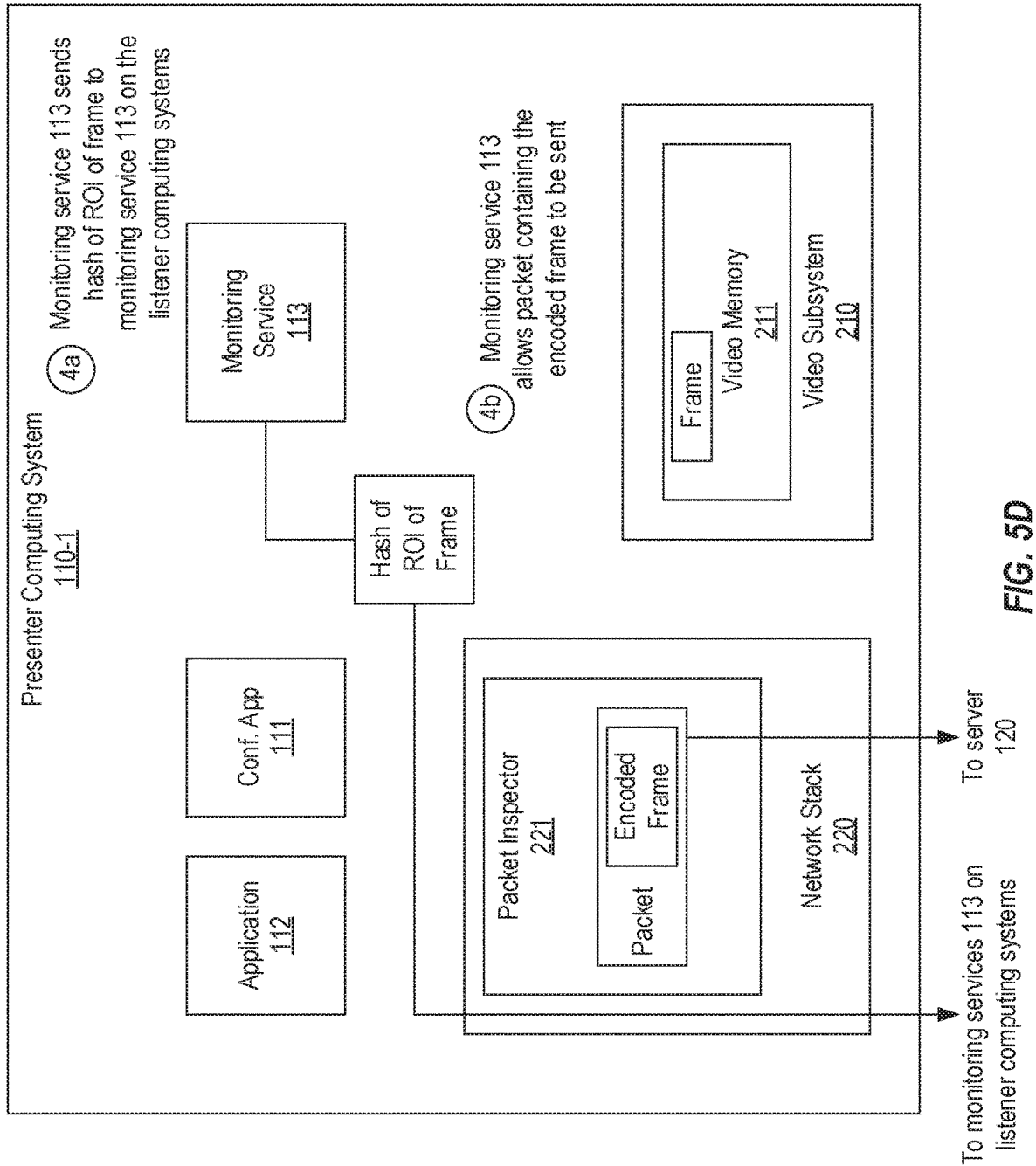

Turning to FIG. 5C, in step 3, monitoring service 113 can employ the hashing type of the selected schema (e.g., pHash) to create a hash of the ROI of the frame it retrieved from video memory 211. Then, in step 4*a* shown in FIG. 5D, monitoring service 113 can send the hash of the ROI of the frame to monitoring service 113 on each listener computing system 110-2 through 110-*n*. In step 4*b*, monitoring service 113 can also allow conferencing application 111's packet containing the encoded frame to be sent to server 120. Monitoring service 113 may send the hash of the ROI of the frame via a reliable transport while the packet containing the encoded frame may likely be sent via an unreliable transport.

Accordingly, monitoring service 113 on presenter computing system 110-1 can determine when conferencing application 111 sends updated shared screen content and can send a hash of at least a portion of the updated shared screen content to monitoring service 113 running on listener computing systems 110-2 through 110-*n*. Because monitoring service 113 may employ a reliable transport to send the hash, even if a listener computing system does not receive the packet containing the encoded frame, it should still receive the hash of the ROI of the frame.

Figure 5E:
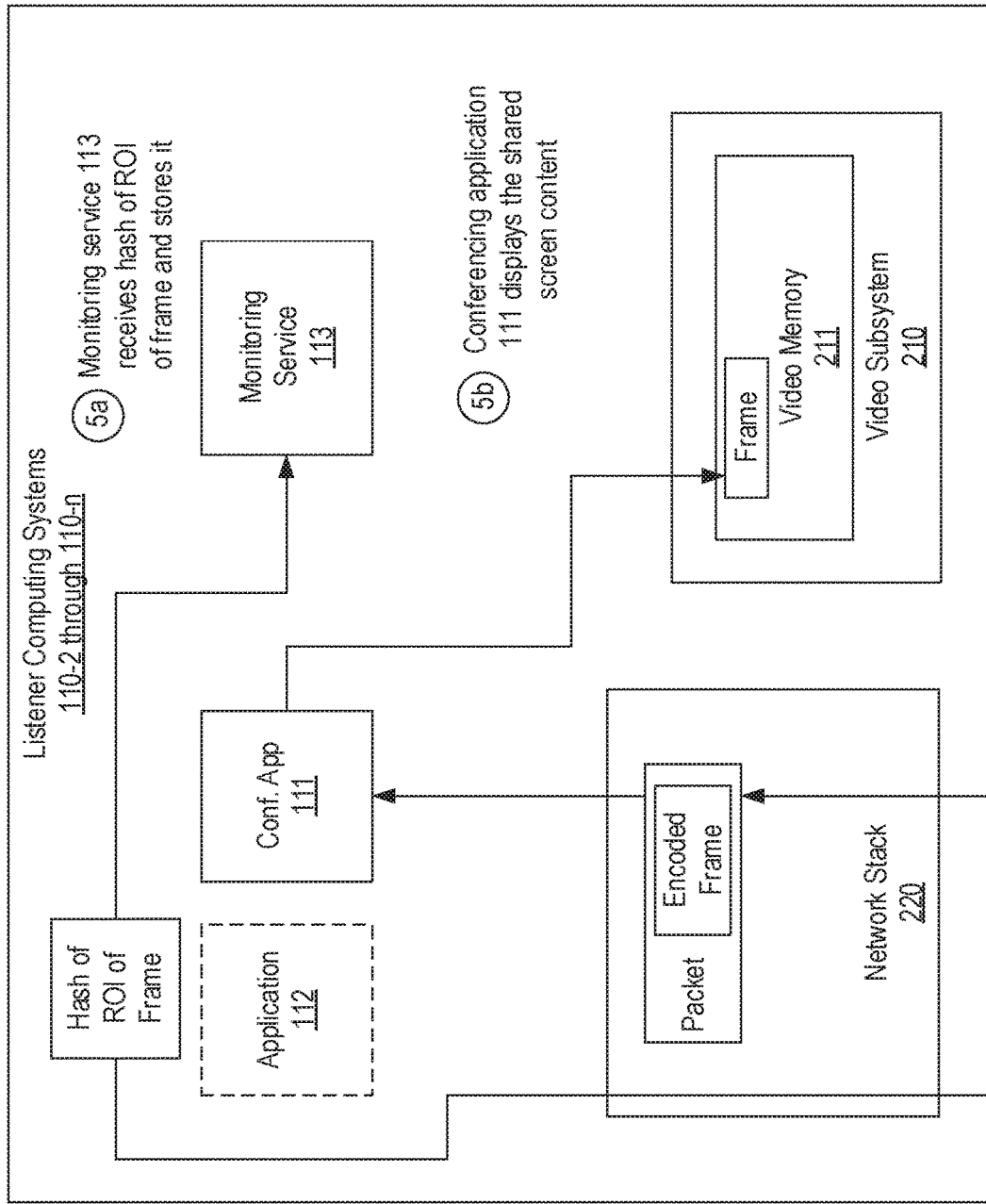

Turning to FIG. 5E, in response to monitoring service 113 on presenter computing system 110-1 sending the hash of the ROI of the frame each time application 112's user interface is updated, in step 5*a*, monitoring service 113 on each listener computing system 110-2 through 110-*n* should receive a hash each time application 112's user interface is updated and can store each hash. If there are no network or other issues, the packets containing the corresponding encoded frames should also be received at each listener computing system 110-2 through 110-*n*. However, if any listener computing system 110-2 through 110-*n* is experiencing network issues, it is likely that the listener computing system will not receive all these packets.

As represented by step 5*b*, if the packet containing the encoded frame is received at the listener computing system, conferencing application 111 will receive the packet and cause the encoded frame to be decoded and rendered thereby causing application 112's user interface to be displayed. Although not shown, packet inspector 221 could also be employed on listener computing systems 110-2 through 110-*n* to allow monitoring service 113 to detect when these packets are received. FIG. 5E therefore represents that monitoring service 113 on each listener computing system 110-2 through 110-*n* should receive and store a hash of the ROI of the frame each time the frame is updated, but conferencing application 111 may or may not receive the packets containing the corresponding encoded frames.

Monitoring service 113 on each listener computing systems 110-2 through 110-*n* can employ the specified schema to detect whether any packets containing the encoded frame (i.e., the shared screen content) have failed to arrive at the listener computing system. In other words, monitoring service 113 can employ the hashes of the ROI of the frames, the frames from the packets that conferencing application 111 actually receives and the specified schema to determine whether the listener computing system is displaying the current shared screen content.

Figure 5F:
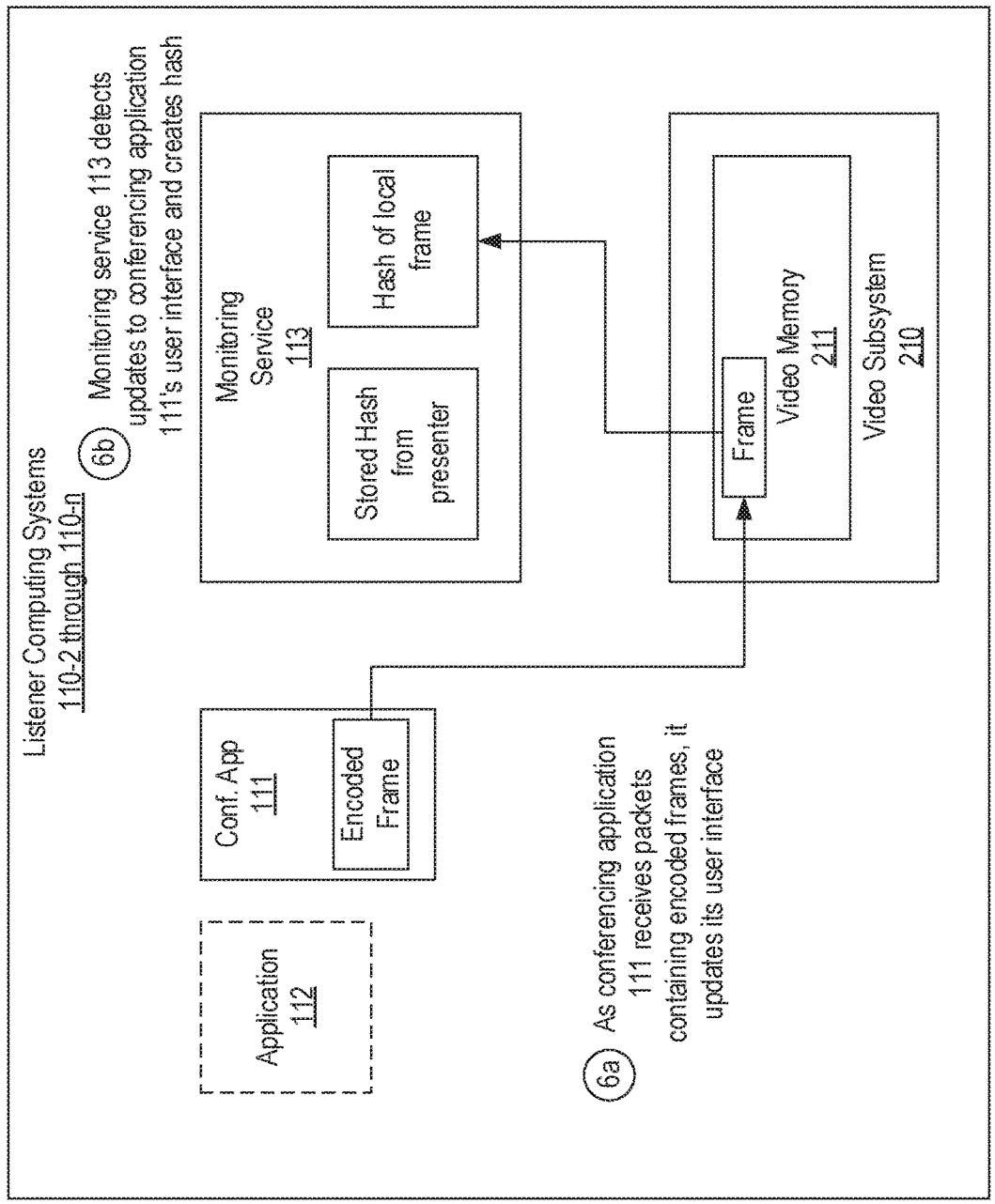

FIG. 5F represents how monitoring service 113 on each listener computing system 110-2 through 110-*n* can implement the specified schema. Monitoring service 113 can be configured to detect when conferencing application 111 updates its user interface. In the scenario where conferencing application 111 is displaying shared screen content (e.g., application 112's user interface), and as represented in step 6*a*, conferencing application 111 on listener computing systems 110-2 through 110-*n* will extract the encoded frame from the packets it receives and employ video subsystem 210 to decode and output the frame. In other words, when it receives shared screen content, conferencing application 111 will display the shared screen content as part of its own user interface In step 6*b*, monitoring service 113 can detect the update to conferencing application 111's user interface, retrieve the frame from video memory 211 (or at least the portion the encompasses the shared screen content) and create a hash using the hashing type of the specified schema (e.g., by applying pHash to the entire frame). Accordingly, monitoring service 113 can store a hash that it received from monitoring service 113 on presenter computing system 110-1 which represents the current shared screen content and a hash that it created locally from conferencing application 111's user interface which may or may not represent the current shared screen content.

Figure 5G:
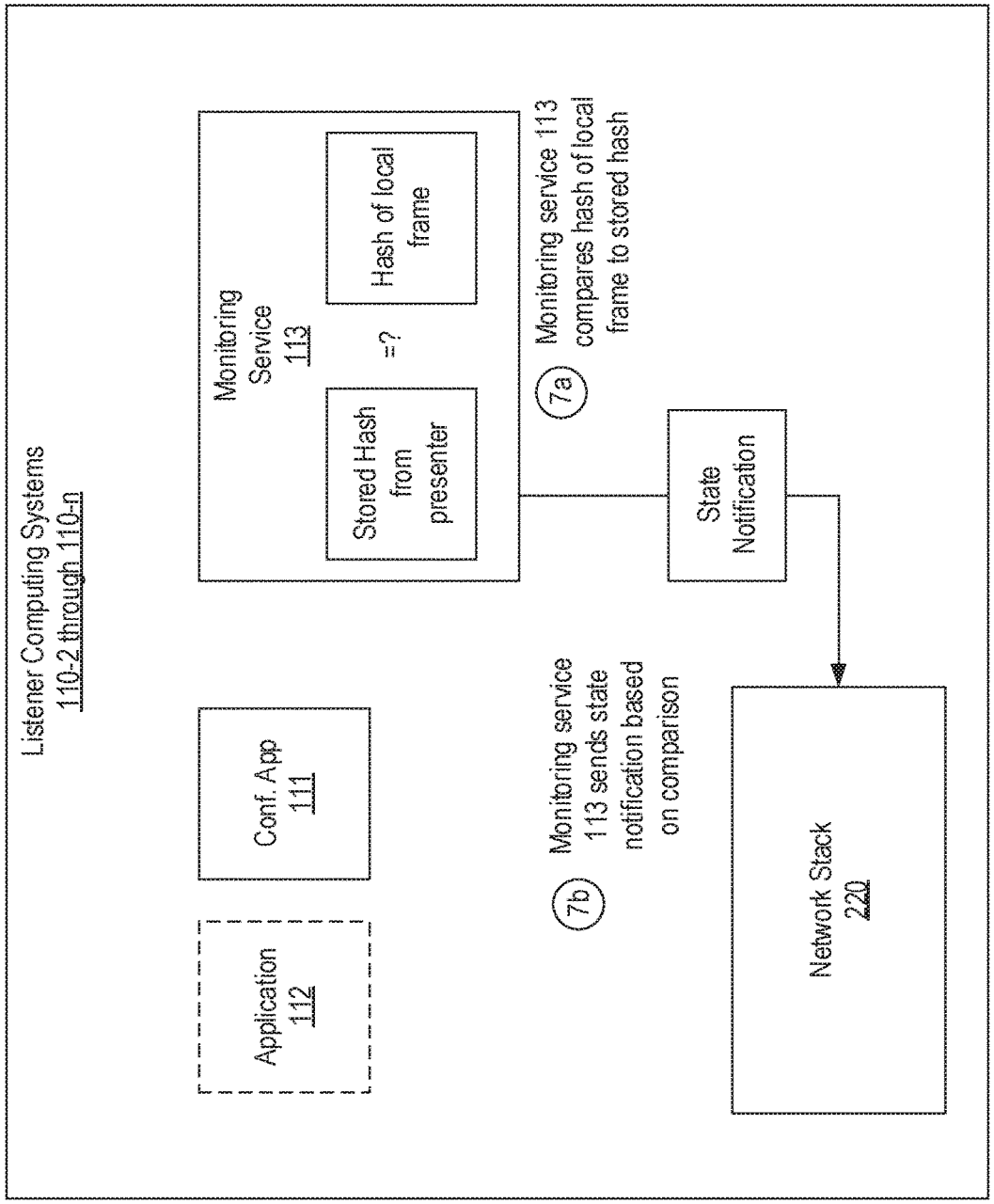

Turning to FIG. 5G, to provide a state notification, in step 7*a*, monitoring service 113 on each listener computing system 110-2 through 110-*n* can compare the hash that it received from monitoring service 113 on presenter computing system 110-1 with the hash that it created when conferencing application 111 updated its user interface. In step 7*b*, monitoring service 113 on each listener computing system 110-2 through 110-*n* can then send a state notification to monitoring service 113 on presenter computing system 110-1. If the stored hash matches the hash created from the local frame, which may be the case when the packet containing the updated shared screen content arrived at the listener computing system, the state notification can indicate that the listener computing system is displaying the current shared screen content. In contrast, if the stored hash does not match the hash created from the local frame, which may be the case when the packet containing the updated shared screen content did not arrive at the listener computing system, the state notification can indicate that the listener computing system is not displaying the current shared screen content.

In some embodiments, monitoring service 113 on presenter computing system 110-1 can presume that each listener computing system 110-2 through 110-*n* is not displaying the current shared screen content unless a state notification is received. In such cases, monitoring service 113 on listener computing systems 110-2 through 110-*n* would send a state notification only when the stored hash matches the hash created from the local frame. Accordingly, in such cases, the failure to receive a state notification from a particular listener computing system defines that the particular listener computing system is not displaying the current shared screen content.

Upon receiving the state notifications, monitoring service 113 on presenter computing system 110-1 could display a visual representation of the state of each listener computing system 110-2 through 110-*n*. In some embodiments, monitoring system 113 could display such visual representations independently of conferencing application 111. In other embodiments, monitoring service 113 could interface with conferencing application 111 to display such visual representations in conferencing application 111's user interface.

In either case, the presenter will be able to identify when any listener has not received the current shared screen content. In some embodiments, monitoring service 113 could interface with conferencing application 111 to cause it to immediately resend the current shared screen content whenever any of listener computing systems 110-2 through 110-*n* provide a state notification indicating that it did not receive the current shared screen content.

In some embodiments, monitoring service 113 on listener computing systems 110-2 through 110-*n* can normalize (e.g., hamming distance) and average the hash it receives from monitoring service 113 on presenter computing system 110-1 prior to the comparison. This normalizing and averaging can account for any differences in alignment and resolution that may be employed on the different computing systems.

In some embodiments, monitoring service 113 on presenter computing system 110-1 can be configured to monitor the load on presenter computing system 110-1 and can dynamically adjust the schema based on the load. For example, if presenter computing system 110-1 is experiencing a higher load, monitoring service 113 could adjust the hashing type, the hashing frequency or the ROI to reduce the load caused by performing step 3 or other steps of the process.

FIGS. 6A-6D represent how monitoring services 113 can implement state detection when high frequency content is shared. For consistency, it will be assumed that the user interface of application 112 is again shared but that application 112 is a high frequency application. A slightly different process can be employed when the shared screen content is high frequency content. In such cases, conferencing application 111 would cause shared screen content to be distributed in a similar manner as shown in FIG. 5A, but the rate at which conferencing application 111 sends packets containing the shared screen content would likely be much higher than in the low frequency content scenario.

Figure 6A:
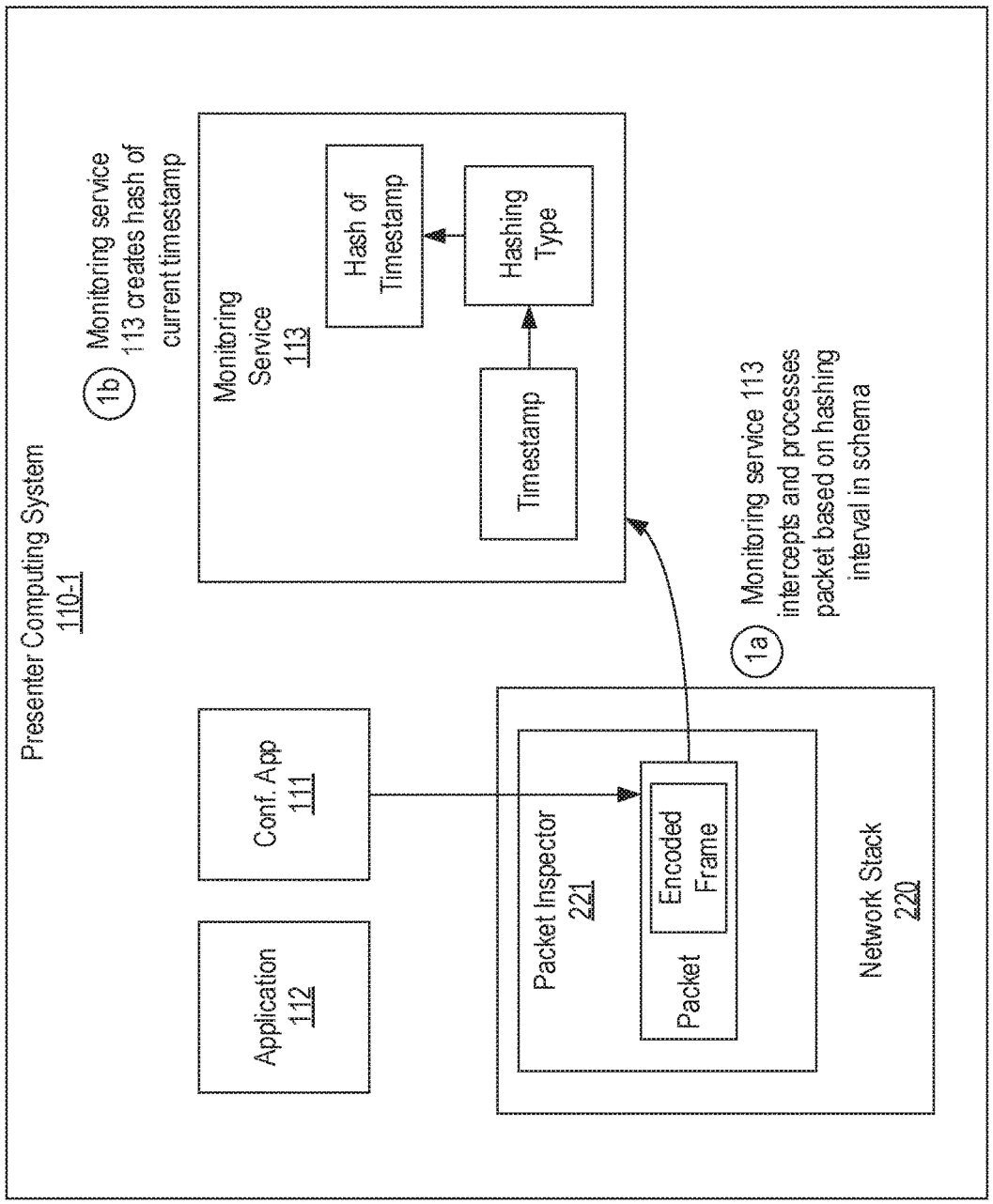
FIGS. 6A-6D represent an example of how high frequency state detection can be performed.

In FIG. 6A, conferencing application 111 is shown as sending packets with encoded frames. Based on the specified schema, in step 1*a*, monitoring service 113 can employ packet inspector 221 to intercept and process such packets such as to process every fifth frame or a frame every 100 ms. As represented in step 1*b*, this processing can include obtaining a current timestamp and employing the hashing type specified in the schema to create a hash of the timestamp.

Figure 6B:
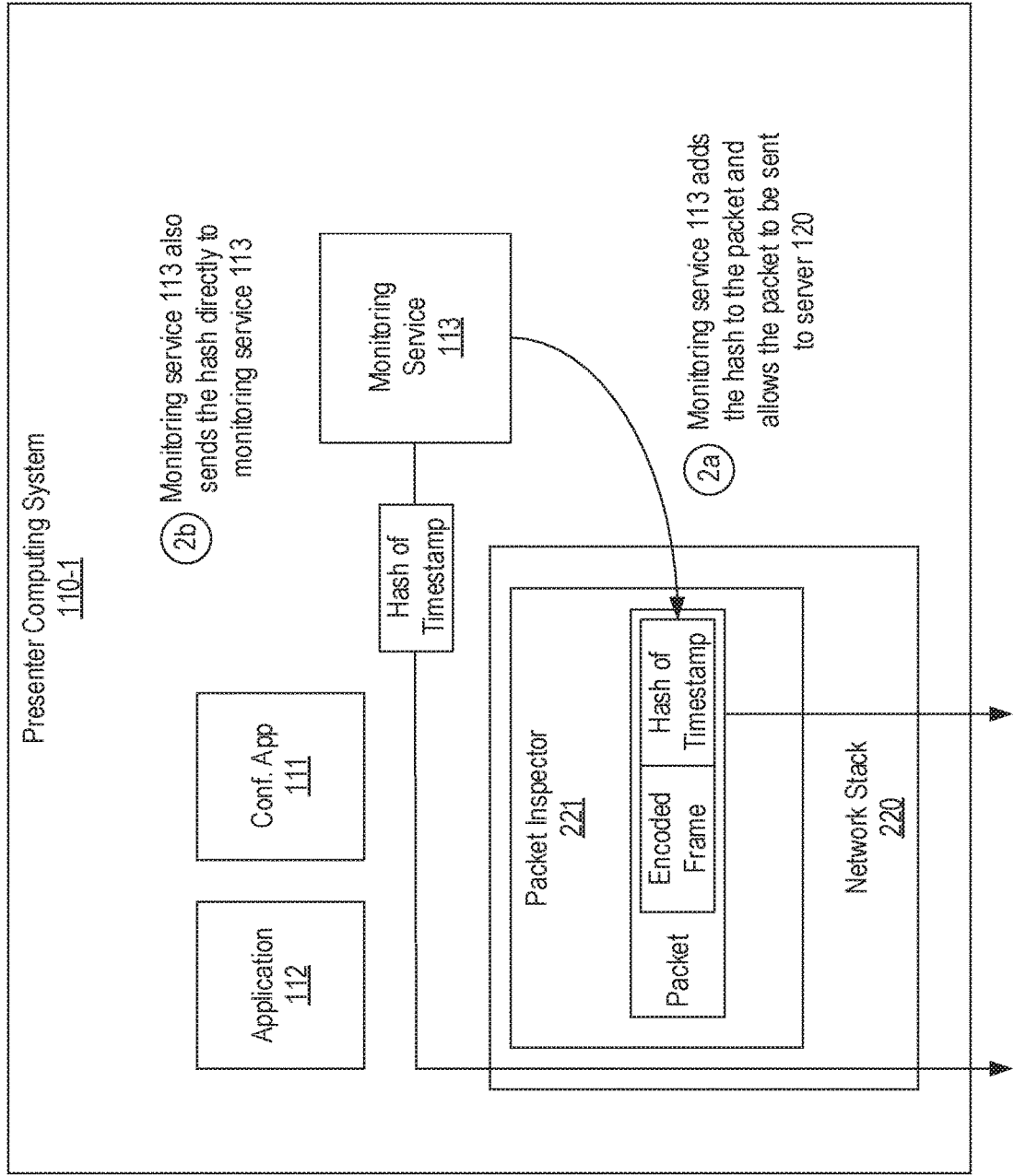

Turning to FIG. 6B, in step 2*a*, monitoring service 113 can add the hash to the payload of the packet that conferencing application 111 is sending. In step 2*b*, monitoring service 113 can also send the hash directly to monitoring service 113 on each listener computing system 110-2 through 110-*n*. Accordingly, if the schema indicates a hashing frequency of every fifth frame, monitoring service 113 can cause every nth packet (or each packet that includes any portion of a fifth frame) to include the hash of the current timestamp and can also send a separate packet containing the hash via a reliable transport mechanism. As a result, monitoring service 113 on each listener computing system 110-2 through 110-*n* should receive each hash that monitoring service 113 sends, but conferencing application 111 on each listener computing system 110-2 through 110-*n* may or may not receive each packet to which monitoring service 113 appended the hash.

Figure 6C:
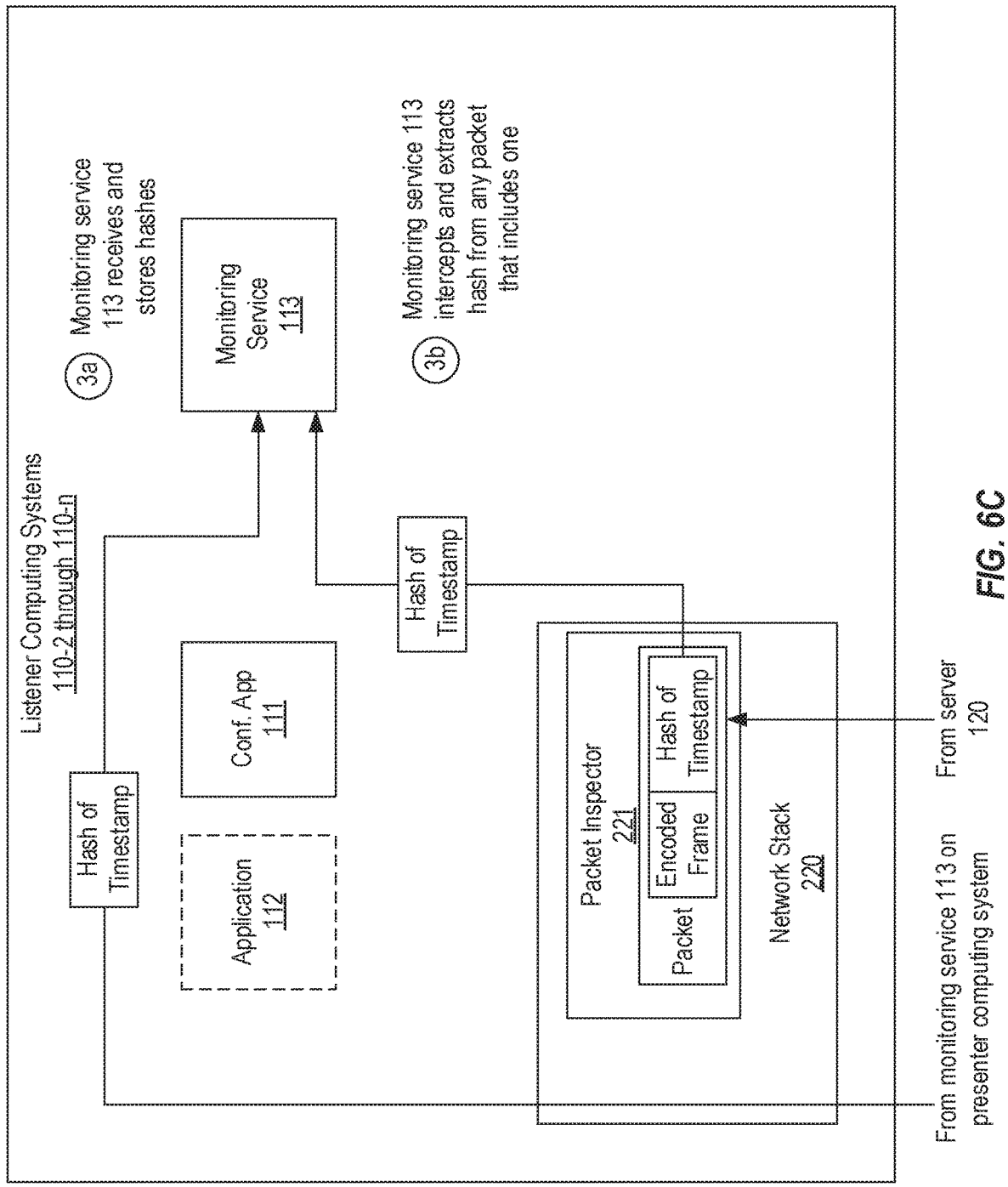

Turning to FIG. 6C, in step 3*a*, monitoring service 113 on each listener computing system 110-2 through 110-*n* receives each hash of the timestamp that monitoring service 113 on presenter computing system 110-1 sends. Also, monitoring service 113 can employ packet inspector 221 to intercept and examine packets that are received from server 120. Accordingly, in step 3b, monitoring service 113 can extract the hash of a timestamp included in any such packet. Notably, if there are network issues, a packet containing a hash may never reach the listener computing system or may be received after a substantial delay.

Figure 6D:
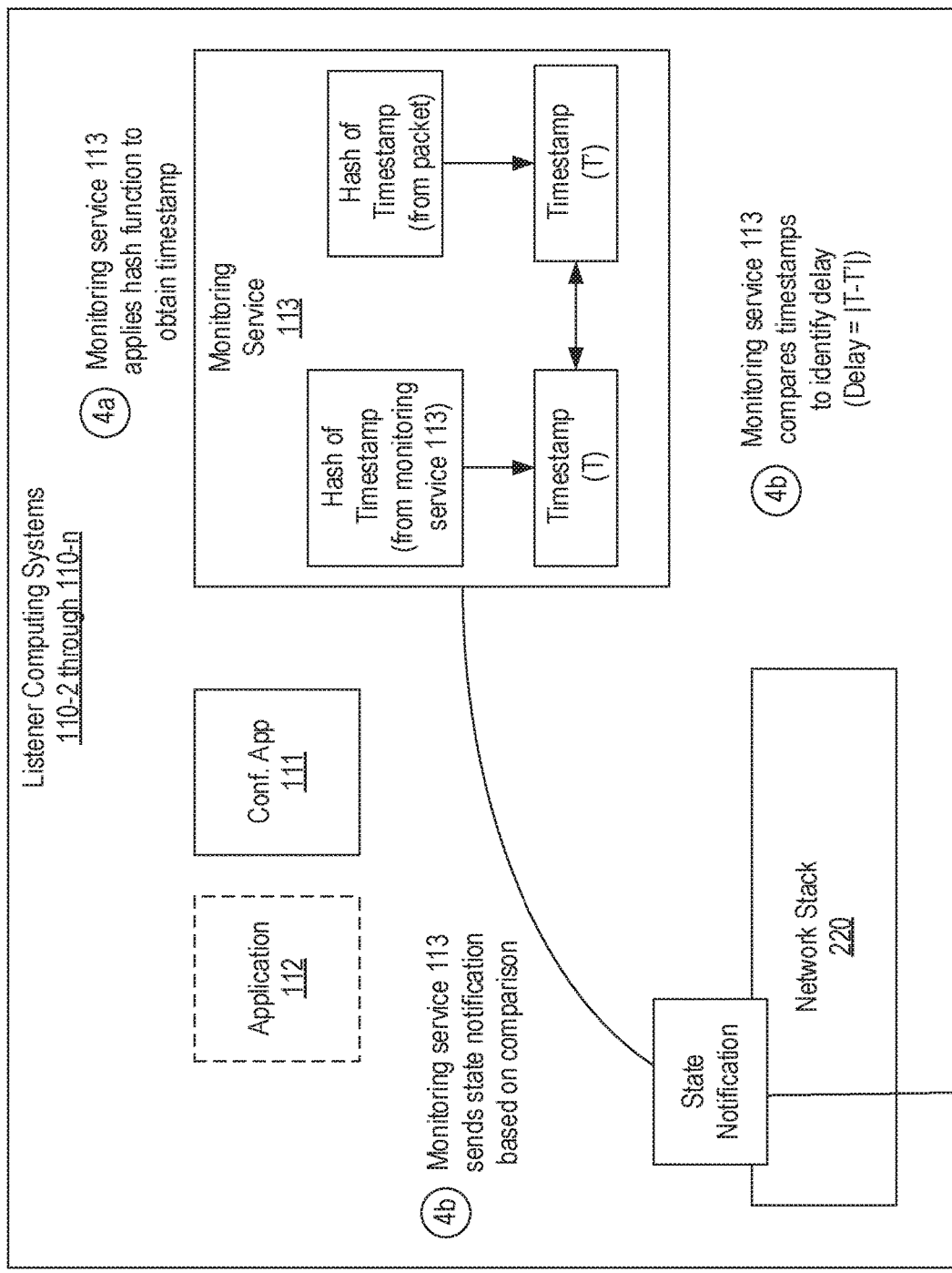

Turning to FIG. 6D, monitoring service 113 can implement the specified schema to detect when the listener computing system may not have received the current shared screen content or has received it after a substantial delay. As shown, in step 4a, monitoring service 113 can apply the hashing type to recreate the timestamp (T) from the hash it received directly from monitoring service 113 on presenter computing system 110-1 and to recreate the timestamp (T') from the hash that it extracted from the packet received via server 120. Timestamp T therefore represents the timestamp of the current shared screen content whether or not it has been received, while timestamp T' represents the timestamp of shared screen content that the listener computing system has actually received.

In step 4b, monitoring service 113 can determine the delay by identifying the absolute value of the difference between T and T'. If the packet containing the current shared screen content was received without delay at the listener computing system, there should be little, if any, difference between T and T'. In contrast, if there is substantial delay or packet loss between server 120 and the listener computing system, there may be a substantial difference between T and T'.

In step 4c, and based on the comparison performed in step 4b, monitoring service 113 on listener computing systems 110-2 through 110-n can send a state notification back to monitoring service 113 on presenter computing system 110-1. Such state notifications could report the delay or could report a representation of the delay. For example, if the delay is less than 100 ms, the state notification may represent a green state, whereas if the delay is 100-500 ms, the state notification may represent a yellow state, while if the delay is greater than 500 ms, the state notification may represent a red state. As described above, monitoring service 113 on presenter computing system 110-1 may respond to such state notifications in a variety of ways. In some embodiments, monitoring service 113 can be configured to cause conferencing application 111 to employ a lower bitrate or to alter other settings that will reduce the bandwidth required to distribute shared screen content. In this way, monitoring service 113 can cause conferencing application 111 to adapt to network issues that may exist between server 120 and any listener computing systems 110-2 through 110-n even if the network connection between presenter computing system 110-1 and server 120 is currently sufficient.

Figure 7A:
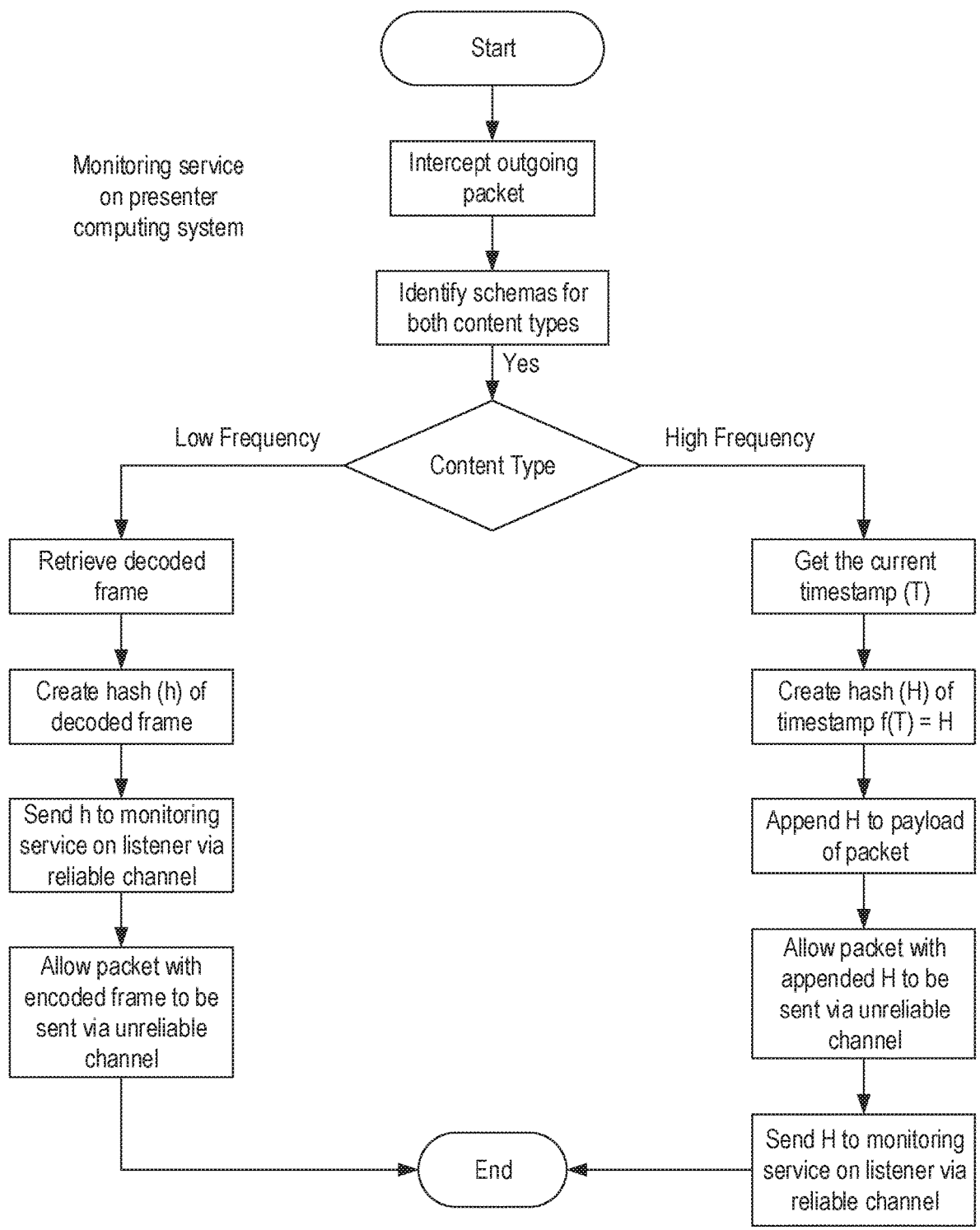
FIGS. 7A and 7B illustrate example flowcharts of processes that can be performed by a monitoring service on a presenter computing system and listener computing systems respectively to perform adaptive state detection.
Figure 7B:
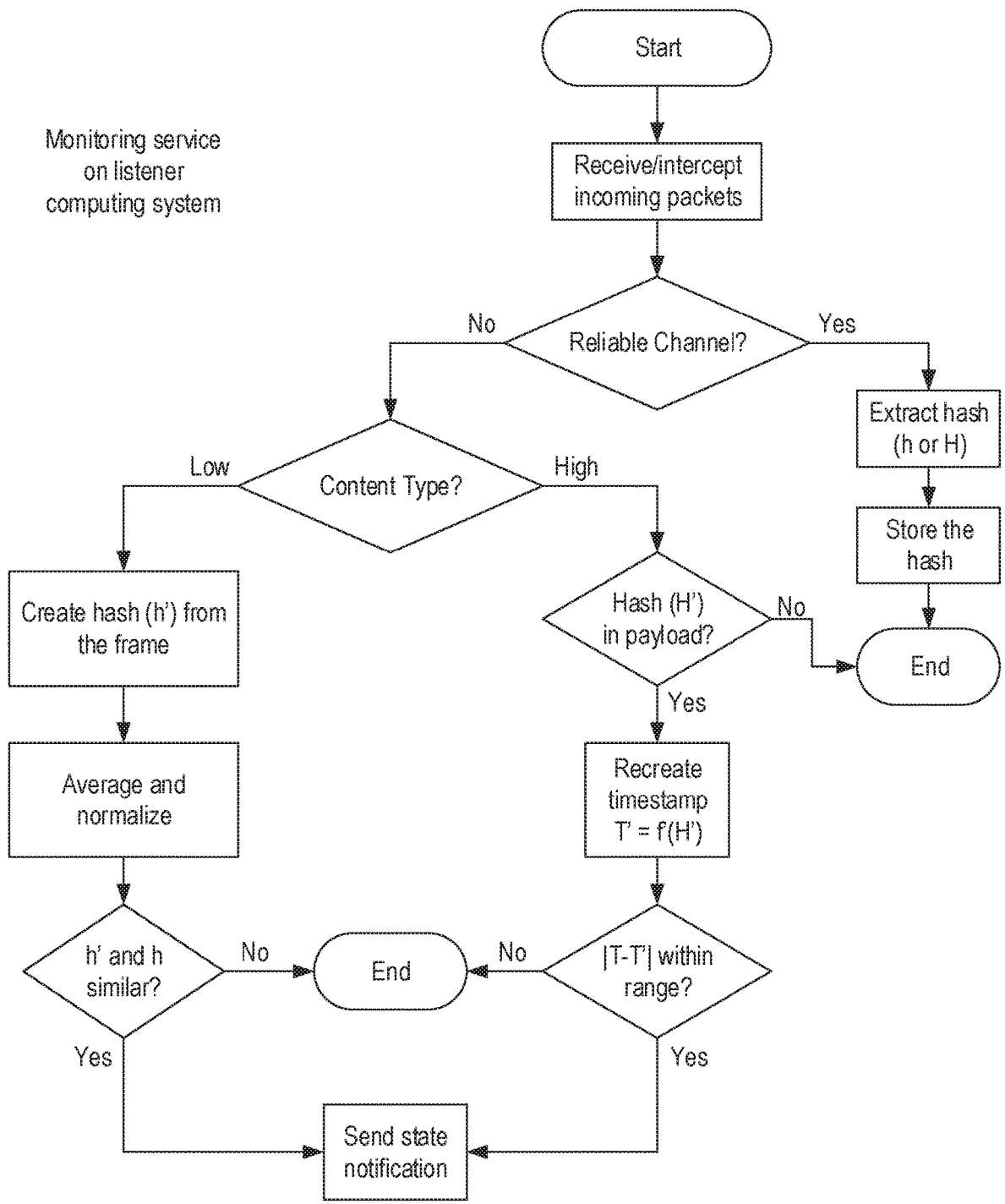

FIGS. 7A and 7B provide flowcharts summarizing functionality that monitoring service 113 can perform on presenter computing system 110-1 and listener computing system 110-2 through 110-n respectively in some use cases but are not intended to encompass every embodiment of the present invention. FIG. 7A represents that monitoring service 113 can apply a schema to an intercepted packet based on the type of content the intercepted packet contains. In the case of low frequency content, monitoring service 113 can send a hash (h) of the decoded frame in a separate packet over a reliable channel. In the case of high frequency content, monitoring service 113 can append a hash (H) of the current timestamp to the intercepted packet and send the hash (H) in a separate packet over a reliable channel.

FIG. 7B represents that monitoring service 113 can store the hash (h or H) contained in any packet it receives over a reliable channel. For packets that target conferencing application 111, contain high frequency content and have an appended hash (H'), monitoring service 113 can recreate the timestamp (T') from the hash (H'), determine whether the timestamp (T') is within a specified range of the timestamp (T) of the current shared screen content and, if so, send a state notification. For packets that target conferencing application 111 and contain low frequency content, monitoring solution 113 can create a hash (h') from the low frequency content (or frame), apply any appropriate averaging or normalizing, determine whether the hash (h') is similar to the hash (h) of the current shared screen content, and, if so, send a state notification. Accordingly, these flowcharts represent a use case where monitoring service 113 sends a state notification only when the listener computing system has received the current shared screen content without any undue delay.

In some embodiments, monitoring services 113 can also perform adaptive state detection during a conference for basic audio ("audio state detection"). In such cases, monitoring services 113 can use a technique similar to the above-described high frequency state detection. Accordingly, this audio state detection will be described with reference to portions of FIGS. 6A-6D.

During a conference, conferencing application 111 on presenter computing system 110-1 will likely continuously send packets containing audio (or "audio frames") that is captured as the presenter speaks. Monitoring service 113 on presenter computing system 110-1 can intercept and process such packets in accordance with a specified schema to generate a hash of a current timestamp (e.g., a hash for the current timestamp when a fifth audio frame is sent or every 100 ms). As in high frequency state detection, monitoring service 113 can append this hash to the packet and also send the hash is a separate packet over a reliable transport. Monitoring service 113 on listener computing systems 110-2 through 110-n can process these packets in a similar manner as shown in FIGS. 6C and 6D. In this way, monitoring service 113 can determine if network or other issues are preventing the listener from hearing the presenter or are creating a delay in the audio.

In contrast to high frequency state detection where only the presenter can distribute shared screen content, in some embodiments, audio state detection can be performed in both directions. For example, when a listener has his/her microphone turned on, conferencing application 111 may capture and send audio of the listener at any time, including while the presenter is speaking. Accordingly, monitoring service 113 may simultaneously perform audio state detection in both directions. In other words, audio state detection can be used to determine both (1) if each listener can hear the presenter; and (2) if the presenter can hear each listener.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for performing adaptive state detection during a conference, the method comprising:
    detecting, by a monitoring service executing on a presenter computing system, that a conferencing application executing on the presenter computing system is distributing shared screen content;
    selecting, by the monitoring service executing on the presenter computing system, a first schema for performing state detection;
    sharing, by the monitoring service executing on the presenter computing system, the first schema with a monitoring service executing on one or more listener computing systems;
    identifying, by the monitoring service executing on the presenter computing system, a packet sent by the conferencing application, the packet including shared screen content;
    in response to identifying the packet, applying, by the monitoring service executing on the presenter computing system, the first schema to produce a reliability packet by creating a hash of a current timestamp and sending the hash of the current timestamp in the reliability packet and by appending the hash of the current timestamp to the packet sent by the conferencing application;
    sending, by the monitoring service executing on the presenter computing system, the reliability packet to the monitoring service executing on the one or more listener computing systems; and
    receiving, by the monitoring service executing on the presenter computing system, a state notification from the monitoring service executing on at least one of the one or more listener computing systems, each state notification representing receipt of the shared screen content at the respective listener computing system.

2. The method of claim 1, wherein identifying the packet sent by the conferencing application comprises intercepting the packet at a network stack.

3. The method of claim 1, further comprising:
    in response to receiving the reliability packet, storing, by the monitoring service executing on each of the one or more listener computing systems, the hash of the current timestamp;
    in response to receiving a packet sent by the conferencing application that includes a hash of a timestamp, recreating the timestamp and comparing the timestamp to the current timestamp that was recreated from the hash of the current timestamp included in the reliability packet; and
    sending the state notification to represent a difference between the timestamp and the current timestamp.

4. The method of claim 1, further comprising:
    detecting, by the monitoring service executing on a presenter computing system, that the conferencing application executing on the presenter computing system is distributing audio content;
    selecting, by the monitoring service executing on the presenter computing system, a third schema for performing audio state detection;
    sharing, by the monitoring service executing on the presenter computing system, the third schema with the monitoring service executing on the one or more listener computing systems;
    identifying, by the monitoring service executing on the presenter computing system, a third packet sent by the conferencing application, the third packet including audio content;
    in response to identifying the third packet, applying, by the monitoring service executing on the presenter computing system, the third schema to produce a third reliability packet;
    sending, by the monitoring service executing on the presenter computing system, the third reliability packet to the monitoring service executing on the one or more listener computing systems; and
    receiving, by the monitoring service executing on the presenter computing system, a third state notification from the monitoring service executing on at least one of the one or more listener computing systems, each third state notification representing receipt of the audio content at the respective listener computing system.

5. The method of claim 4, wherein each third state notification represents one of:
    whether the respective listener computing system received the audio content; or
    a delay at which the respective listener computing system received the audio content.

6. The method of claim 1, further comprising:
selecting, by the monitoring service executing on the presenter computing system, a second schema for performing state detection;
sharing, by the monitoring service executing on the presenter computing system, the second schema with the monitoring service executing on the one or more listener computing system;
identifying, by the monitoring service executing on the presenter computing system, a second packet sent by the conferencing application, the second packet including second shared screen content;
in response to identifying the second packet, applying, by the monitoring service executing on the presenter computing system, the second schema to produce a second reliability packet;
sending, the monitoring service executing on the presenter computing system, the second reliability packet to the monitoring service executing on the one or more listener computing systems; and
receiving, by the monitoring service executing on the presenter computing system, a second state notification from the monitoring service executing on at least one of the one or more listener computing systems, each second state notification representing receipt of the second shared screen content at the respective listener computing system.

7. The method of claim 6, wherein each state notification and second state notification represents one of:
whether the respective listener computing system received the respective shared screen content; or
a delay at which the respective listener computing system received the respective shared screen content.

8. The method of claim 6, wherein the first schema and the second schema each defines one or more of:
a hashing type;
a hashing frequency; or
a region of interest of a frame of the shared screen content.

9. The method of claim 6, wherein the monitoring service executing on the presenter computing system selects the first schema and the second schema for performing state detection based on a type of the shared screen content.

10. The method of claim 9, wherein the type is one of high frequency content or low frequency content.

11. The method of claim 6, wherein applying the second schema to produce the reliability packet comprises:
creating a hash of the second shared screen content; and
sending the hash of the second shared screen content in the second reliability packet.

12. The method of claim 11, wherein the second shared screen content comprises an encoded frame, and wherein creating the hash of the second shared screen content comprises:
obtaining a decoded version of the encoded frame; and
creating the hash of at least a portion of the decoded version of the encoded frame.

13. The method of claim 12, further comprising:
in response to receiving the second reliability packet, creating, by the monitoring service executing on each of the one or more listener computing systems, a hash of shared screen content that has been received at the respective listener computing system;
comparing the hash of the shared screen content that has been received at the respective listener computing system to the hash in the second reliability packet; and
when the hash of the shared screen content that has been received at the respective listener computing system matches the hash in the second reliability packet, sending the second state notification to represent that the respective listener computing system has received the second shared screen content for which the second reliability packet was produced.

14. One or more computer storage media storing computer executable instruction which when executed implement a method for performing adaptive state detection during a conference, the method comprising:
detecting, by a monitoring service executing on a presenter computing system, that a conferencing application executing on the presenter computing system is distributing shared screen content;
selecting, by the monitoring service executing on the presenter computing system, a first schema for performing state detection, the schema being selected based on a type of the shared screen content;
sharing, by the monitoring service executing on the presenter computing system, the first schema with a monitoring service executing on one or more listener computing systems;
while the conferencing application is distributing the shared screen content, employing, by the monitoring service executing on the presenter computing system, the first schema to repeatedly create and send reliability packets to the monitoring service executing on the one or more listener computing systems, wherein a reliability packet is created by creating a hash of a current timestamp and sending the hash of the current timestamp in the reliability packet and wherein employing the first schema further comprises appending the hash of the current timestamp to a packet containing shared screen content sent by the conferencing application; and
in response to repeatedly sending the reliability packets, repeatedly receiving, by the monitoring service executing on the presenter computing system, a state notification from the monitoring service executing on at least one of the one or more listener computing systems, each state notification representing receipt of the shared screen content at the respective listener computing system.

15. The computer storage media of claim 14, wherein the method further comprises:
selecting, by the monitoring service executing on the presenter computing system, a second schema for performing state detection;
sharing, by the monitoring service executing on th e presenter computing system, the second schema with the monitoring service executing on the one or more listener computing systems;
while the conferencing application is distributing second shared screen content, employing, by the monitoring service executing on the presenter computing system, the second schema to repeatedly create and send second reliability packets to the monitoring service executing on the one or more listener computing systems; and
in response to repeatedly sending the second reliability packets, repeatedly receiving, by the monitoring service executing on the presenter computing system, a second state notification from the monitoring service executing on at least one of the one or more listener computing systems, each second state notification representing receipt of the second shared screen content at the respective listener computing system.

16. The computer storage media of claim 15, wherein the monitoring service executing on the presenter computing system creates each second reliability packet by:
- creating a hash of the second shared screen content; and
- sending the hash of the second shared screen content in the second reliability packet.

17. The computer storage media of claim 15, wherein employing the second schema to repeatedly create and send the second state notifications comprises, for each second reliability packet received:
- extracting, from the second reliability packet, a hash of the respective shared screen content;
- creating a hash of shared screen content that has been received at the respective listener computing system; and
- sending the second state notification to represent whether the hash of the respective shared screen content is similar to the hash of the shared screen content that has been received.

18. The computer storage media of claim 14, wherein the method further comprises:
- employing, by the monitoring service executing on each of the one or more listener computing systems, the first schema to repeatedly create and send the state notifications to the monitoring service executing on the presenter computing system.

19. The computer storage media of claim 18, wherein employing the first schema to repeatedly create and send the state notifications comprises, for each reliability packet received:
- extracting, from the reliability packet, the hash of the current timestamp;
- extracting, from the packet containing the shared screen content, the hash of the timestamp; and
- sending the state notification to represent whether the hash of the current timestamp extracted from the reliability packet matches the hash of the timestamp extracted from the packet.

20. A method for performing adaptive state detection during a conference, the method comprising:
- detecting, by a monitoring service executing on a presenter computing system, that a conferencing application executing on the presenter computing system is distributing shared screen content;
- determining, by the monitoring service executing on the presenter computing system and at multiple times, whether the shared screen content is high frequency content or low frequency content;
- selecting, by the monitoring service executing on the presenter computing system, a first schema at a first time and a second schema at a second time for performing state detection based on whether the shared screen content is high frequency content or low frequency content;
- sharing, by the monitoring service executing on the presenter computing system, the first schema at the first time and the second schema at the second time with a monitoring service executing on one or more listener computing systems;
- as the conferencing application sends packets containing the shared screen content, applying, by the monitoring service executing on the presenter computing system, the first schema at the first time and the second schema at the second time to produce reliability packets;
- sending, by the monitoring service executing on the presenter computing system, the reliability packets to the monitoring service executing on the one or more listener computing systems; and
- receiving, by the monitoring service executing on the presenter computing system, state notifications from the monitoring service executing on the one or more listener computing systems, each state notification representing one of: whether the respective listener computing system received the shared screen content; or a delay at which the respective listener computing system is receiving the shared screen content;
- wherein applying the first schema to produce the reliability packets comprises; creating a hash of a current timestamp, sending the hash of the current timestamp in the reliability packet, and appending the hash of the current timestamp to a corresponding packet sent by the conferencing application; and
- wherein applying the second schema to produce the reliability packets comprises: creating a hash of the shared screen content and sending the hash of the shared screen content in the reliability packet.

\* \* \* \* \*